United States Patent
Nazari et al.

(10) Patent No.: US 10,783,021 B2
(45) Date of Patent: Sep. 22, 2020

(54) TRANSACTION MANAGEMENT FOR MULTI-NODE CLUSTERS

(71) Applicant: HEWLETT PACKARD ENTERPRISE DEVELOPMENT LP, Houston, TX (US)

(72) Inventors: Siamak Nazari, Mountain View, CA (US); Jin Wang, Cupertino, CA (US); Jonathan Stewart, Belfast (GB); Roopesh Kumar Tamma, Fremont, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 73 days.

(21) Appl. No.: 15/770,845

(22) PCT Filed: Mar. 31, 2016

(86) PCT No.: PCT/US2016/025323
§ 371 (c)(1),
(2) Date: Apr. 25, 2018

(87) PCT Pub. No.: WO2017/171803
PCT Pub. Date: Oct. 5, 2017

(65) Prior Publication Data
US 2018/0314570 A1    Nov. 1, 2018

(51) Int. Cl.
*G06F 11/07*    (2006.01)
*G06F 11/20*    (2006.01)
(Continued)

(52) U.S. Cl.
CPC .............. *G06F 11/07* (2013.01); *G06F 11/14* (2013.01); *G06F 11/2023* (2013.01);
(Continued)

(58) Field of Classification Search
CPC .......... G06F 3/06; G06F 9/5072; G06F 11/07; G06F 11/2056; G06F 11/2069;
(Continued)

(56) References Cited

U.S. PATENT DOCUMENTS

| 6,865,157 | B1 | 3/2005 | Scott et al. |
| 7,440,977 | B2 | 10/2008 | Bae et al. |

(Continued)

FOREIGN PATENT DOCUMENTS

| CN | 101188569 A | 5/2008 |
| CN | 101980192 A | 2/2011 |

(Continued)

OTHER PUBLICATIONS

Belay, A. et al., "IX: A Protected Dataplane Operating System for High Throughput and Low Latency," Dec. 20, 2015, pp. 49-65, http://web.eecs.umich.edu/~mosharaf/Readings/IX.pdf.
(Continued)

*Primary Examiner* — George C Neurauter, Jr.
(74) *Attorney, Agent, or Firm* — Hewlett Packard Enterprise Patent Department

(57) ABSTRACT

Examples include transaction management for a multi-node cluster. Some examples include generating a request log entry at an owner node that identifies a duplicate data location, tagging the duplicate data location with a requested tag, and issuing a zero-copy request that identifies the duplicate data location. In some such examples, a service node may generate a service log entry based on the zero-copy request that identifies the duplicate data location, process the zero-copy request, and tag the duplicate data location with a serviced tag. A determination may be made as to whether at least one of the owner node and the service node have failed and based on the determination that at least one has failed, the failed node may be recovered via at least
(Continued)

one of the requested tag and the serviced tag of the duplicate data location.

17 Claims, 12 Drawing Sheets

(51) Int. Cl.
| | |
|---|---|
| G06F 11/14 | (2006.01) |
| G06F 13/28 | (2006.01) |
| H04L 12/24 | (2006.01) |
| H04L 12/26 | (2006.01) |
| H04L 29/08 | (2006.01) |
| H04L 29/14 | (2006.01) |

(52) U.S. Cl.
CPC ...... *G06F 11/2035* (2013.01); *G06F 11/2043* (2013.01); *G06F 13/28* (2013.01); *H04L 41/0654* (2013.01); *H04L 43/0817* (2013.01); *H04L 67/1002* (2013.01); *H04L 69/40* (2013.01)

(58) Field of Classification Search
CPC .. G06F 11/2089; G06F 11/2094; G06F 13/28; H04L 41/0654; H04L 43/0817; H04L 67/1002; H04L 69/40
See application file for complete search history.

(56) References Cited

U.S. PATENT DOCUMENTS

| | | |
|---|---|---|
| 7,757,056 B1 | 7/2010 | Fair |
| 7,996,569 B2 | 8/2011 | Aloni et al. |
| 8,489,829 B2 | 7/2013 | Aronovich et al. |
| 8,645,634 B1 | 2/2014 | Cox et al. |
| 8,762,595 B1 | 6/2014 | Muller et al. |
| 9,047,221 B2 | 6/2015 | Guthrie et al. |
| 2006/0259525 A1 | 11/2006 | Bae et al. |
| 2012/0144135 A1 | 6/2012 | Aronovich et al. |
| 2013/0339567 A1 | 12/2013 | Carpentier et al. |
| 2014/0164701 A1 | 6/2014 | Guthrie et al. |
| 2014/0189423 A1 | 7/2014 | Carpentier et al. |
| 2014/0344216 A1 | 11/2014 | Abercrombie et al. |
| 2014/0351214 A1 | 11/2014 | Abercrombie et al. |

FOREIGN PATENT DOCUMENTS

| | | |
|---|---|---|
| CN | 102882864 A | 1/2013 |
| CN | 104038569 A | 9/2014 |
| CN | 105335406 A | 2/2016 |

OTHER PUBLICATIONS

International Search Report & Written Opinion received in PCT Application No. PCT/US2016/025323, dated Dec. 22, 2016, 10 pages.

Objective Interface Systems, Inc., "PCSexpress," retrieved online Feb. 26, 2016, 2 pages, Http://www.ois.com/products/pcsexpress.html.

Wang, W. W., "Direct User Calls from the Kernel: Design and Implementation," 2007, 58 pages, https://cs.uwaterloo.ca/~brecht/theses/Wang-MMath.pdf.

US 10,783,021 B2

TRANSACTION MANAGEMENT FOR MULTI-NODE CLUSTERS

BACKGROUND

A cluster may involve multiple nodes (e.g., computers, servers) that work together as a single system to execute applications or perform various functions. In some examples, a cluster may provide greater speed, availability, and fault tolerance than a single node may provide. Nodes in a cluster may utilize redundancy in processing and/or storage to provide a high availability system in which failure of a single node may allow for continued service with minimal interruption or delay. Redundancy, however, can result in greater latency and/or resource usage.

BRIEF DESCRIPTION OF THE DRAWINGS

The following detailed description references the drawings, wherein.

DETAILED DESCRIPTION

Figure 1A:
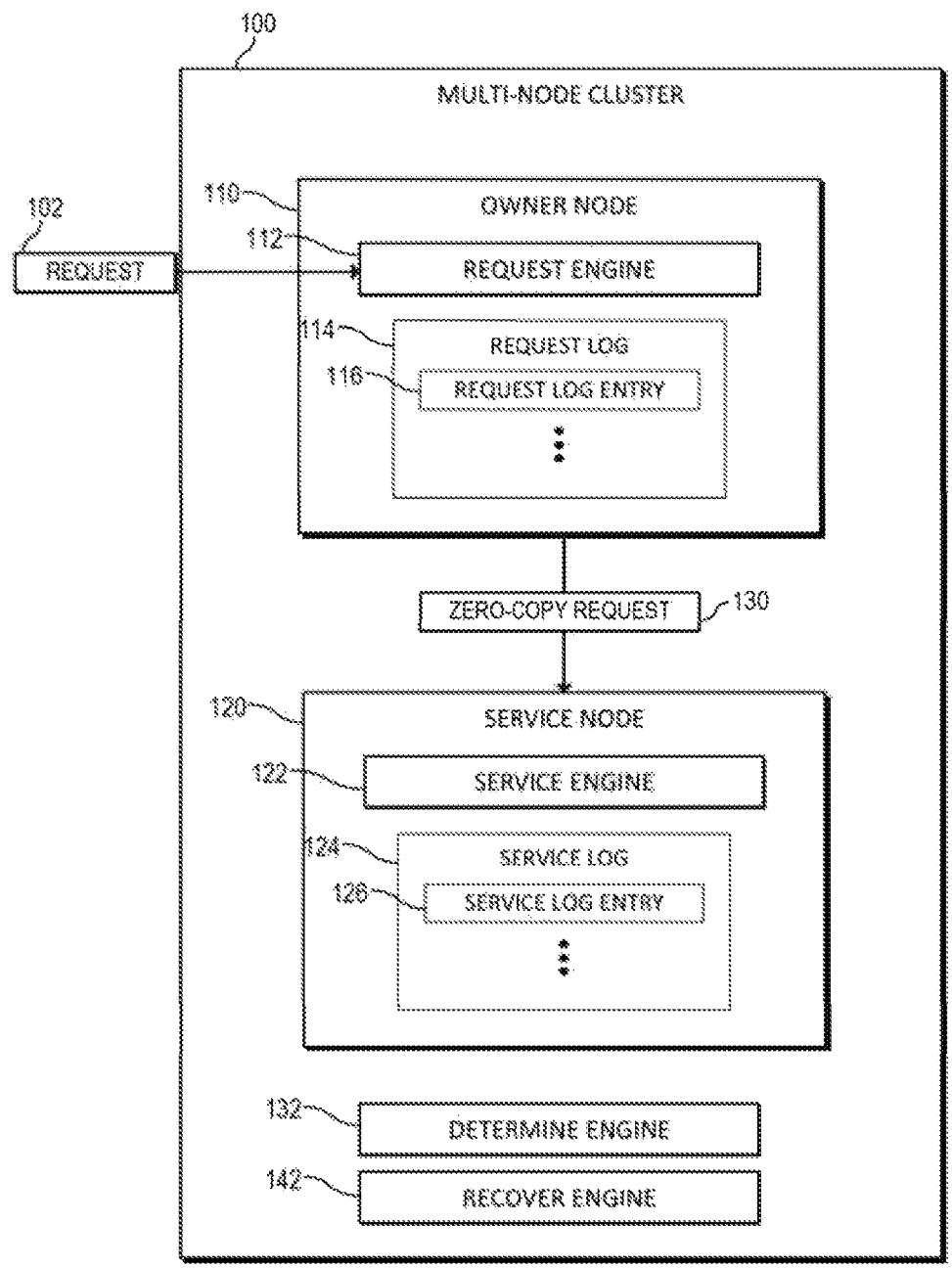
FIG. 1A is a block diagram of an example transaction management system for a multi-node cluster in which at least one of a requested tag and a serviced tag are used to recover a node.

A high availability cluster may allow for greater speed and reliability when a failure or fault occurs. Unlike single node systems in which a fault may result in a shut-down or interruption in service until an administrator intervention, a high availability cluster allows for a different node to continue services that may be interrupted due to a fault on a first node. Upon a failure in a first node, a high availability cluster may rely on a redundant node capable of taking over operations for the failed node. In some examples, a redundant node may have a copy of any data located on the first node. In other examples, a redundant node may shadow the operations of the first node or may contribute to the processing of operations by the first node.

In some examples, to achieve high availability, nodes within a cluster may share memory. For example, all nodes in a cluster may share all memory, allowing each node access to the shared memory. In another example, some or all nodes may share some memory. In such examples, the nodes may engage in zero-copy operations.

Zero-copy operations attempt to minimize the number of times a processor must copy data from one memory to another. For example, a non-zero-copy read or write operation may involve several copy operations, including copies by a central processing unit (CPU) or processing resource. In one example, reading data from one memory location and writing it to another may involve at least two copes by a CPU or processing resource. For instance, data may first be copied from a hard disk or other persistent storage area to an operating system buffer via, for example, a direct memory access (DMA) based copy operation. A central processing unit (CPU) or other processing resource may then copy the data from the operating system buffer to a CPU or processing resource cache buffer to utilize the data. To write the data to another memory location, the CPU or processing resource may copy the data from the cache buffer to another operating system buffer. A DMA-based copy operation may finally copy the data from the operating system buffer to its final location in, for example, persistent storage. A zero-copy operation may, in some examples, minimize CPU or processing resource copies through the use of DMA-based copying, memory mapping via a memory management unit (MMU), sharing memory, and/or other techniques.

While shared memory amongst nodes in a cluster may, in some examples, facilitate zero-copy operations, the complexity and connections required for shared memory may be cost-prohibitive, inefficient, and computationally intensive. Shared memory amongst nodes may also be difficult to scale when additional nodes are to be added to a system. Further, sharing memory across nodes may overload or hinder fault tolerance approaches which may need to take into account data synchronization provisions and may result in overly burdensome fault tolerance schemes.

Examples described herein may improve fault tolerance and transaction management in a multi-node cluster via tagging of memory associated with a zero-copy request. In some examples, the memory may be pre-allocated between nodes or processes on nodes. An owner node, which receives requests, may generate a request log entry in a request log for the request that identifies a duplicate data location, tag the duplicate data location with a requested tag, and issue a zero-copy request that identifies the duplicate data location. A service node may receive the zero-copy request for processing and may tag the duplicate data location with a serviced tag. In such examples, when a failure occurs at a node, a recover engine may utilize the requested tag and/or serviced tag of a duplicate data location to recover the data and complete the transaction.

In some examples described herein, a transaction management system for a multi-node cluster may involve a request engine of an owner node of the multi-node cluster. The request engine may generate for a request, a request log entry in a request log that identifies a duplicate data location, tag the duplicate data location with a requested tag, and issue a zero-copy request that identifies the duplicate data location. A service engine of a service engine of the multi-node cluster may, based on the zero-copy request, generate a service log entry in a service log that identifies the duplicate data location, process the zero-copy request, and tag the duplicate data location with a serviced tag, wherein the serviced tag replaces the requested tag. A determine engine may determine whether the owner node or the service node has failed, and based on the determination that at least one of the owner node and the service node have failed, a recover engine may recover a failed node via at least one of the requested tag and the serviced tag of the duplicate data location. In examples described herein, a determination, action, etc., that is said to be based on a given condition may be based on that condition alone or based on that condition and other condition(s).

In some examples described herein, a method of managing transactions for a multi-node cluster may involve receiving, at a request engine of an owner node of the multi-node cluster, a request containing data, storing the data at the owner node, duplicating the data at a duplicate data location, generating for the request a request log entry in a request log that identifies the duplicate data location, and issuing a zero-copy request that identifies the duplicate data location to a service engine of a service node of the multi-node cluster. Based on the zero-copy request, a service log entry in a service log may be generated that identifies the duplicate data location. The method may further involve determining whether the owner node and the service node have failed and, based on determining that at least one of the owner node and the service node have failed, recovering a failed node via at least one of a requested tag and a serviced tag of the duplicate data location.

In some examples described herein, a processing resource in a transaction management system for a multi-node cluster may execute instructions on a machine-readable storage medium to receive, at an owner node of the multi-node cluster, a request containing data. The processing resource may further execute instructions to generate for the request a request log entry in a request log that identifies a duplicate data location in a pre-allocated memory block, tag the duplicate data location with a requested tag, and issue a zero-copy request that identifies the duplicate data location to a service node of the multi-node cluster, The instructions may, based on the zero-copy request, generate a service log entry in a service log that identifies the duplicate data location, process the zero-copy request, and tag the duplicate data location with a serviced tag, wherein the serviced tag replaces the requested tag. The processing resource may also execute instructions to determine whether the owner node and service node have failed and, based on a determination that at least one of the owner node and the service node have failed, recover a failed node via at least one of the requested tag and the serviced tag of the duplicate data location.

Referring now to the drawings, FIG. 1A is a block diagram of an example transaction management system for a multi-node cluster 100. A multi-node cluster, as described herein, may refer to multiple nodes that work together as a single system. In some examples, each node of the multi-node cluster may utilize a same operating system configuration and a same or similar hardware configuration. In other examples, nodes of the multi-node cluster may utilize differing operating system configurations or differing hardware configurations. A node may be any networking or computing device suitable for execution of the functionality described below. As used herein, a node may be a desktop computer, laptop (or notebook) computer, workstation, tablet computer, mobile phone, smart device, switch, router, server, blade enclosure, or any other processing device or equipment including a processing resource.

Multi-node cluster 100 may comprise an owner node 110 and a service node 120. As described herein, owner node 110 may refer to a node within multi-node cluster 100 that owns or manages a particular request, i.e., request 102. Service node 120, as described herein, may refer to a node within multi-node cluster 100 that services or processes a particular request. In some examples, nodes 110 and 120 within multi-node cluster 100 may communicate via a computer network (e.g., Internet, Local Area Network (LAN), Wide Area Network (WAN), etc.). Although two nodes 110 and 120 are illustrated in FIG. 1A, in examples described herein, a multi-node cluster may involve any suitable number of nodes more than one.

Owner node 110 may include a request engine 112, which may receive a request 102 and generate a request log entry 116 in a request log 114. In the examples described herein, a request may represent a transaction or operation to be performed by the multi-node cluster 100. As an example, request 102 may be a request to perform a write operation. A request log, in the examples described herein, may refer to a log of transactions associated with a request engine. In some examples, request log 114 may log all requests received at, initiated by, or otherwise associated with owner node 110. In other examples, request log 114 may log all transactions associated with owner node 110. In yet other examples, request log 114 may log all requests or transactions associated with request engine 112. As shown in FIG. 1A, request log 114 may be located at owner node 110. A redundant copy of request log 114 may also be created at another node of multi-node cluster 100 such as service node 120. In some examples, a redundant copy of request log 114 may be created at each node of multi-node cluster 100. In other examples, a redundant copy of request log 114 may be created at multiple, but not all, nodes of multi-node cluster 100. In some such examples, request log 114 may be mirrored to another node. Request log 114 may also be located separate or remote from, but accessible to multi-node cluster 100.

As shown in FIG. 1A, request log 114 may comprise numerous request log entries 116. As described herein, a request log entry refers to each entry within a request log. Each request log entry 116 may represent a particular request or transaction associated with request engine 112. In other examples, each request log entry 116 may represent a request or transaction associated with owner node 110. Request log entry 116 may further identify a duplicate data location. A duplicate data location, as described herein, may refer to a duplicate or second storage area location for data that may be accessed by request engine 112 on owner node 110, a service engine 122 on service node 120, and a recover engine 132, as necessary. In some examples, request log entry 116 may identify the duplicate data location with a pointer, an address, or other mechanism sufficient to identify the duplicate data location.

After generating request log entry 116 in request log 114, request engine 112 may tag the duplicate data location with a requested tag. A tag, as used herein, may refer to a bit or a series of bits associated with a memory location that indicates a specific action. For example, the requested tag may indicate that a request engine has received a request, i.e., request 102, related to the tagged duplicate data location. Request engine 112 may then issue (e.g., generate, send) a zero-copy request 130 that identifies the duplicate data location. In some examples, request engine 112 may issue zero-copy request 130 to service node 120 and/or a service engine 122 located on service node 120. In other examples, owner node 110 may receive zero-copy request 130 from request engine 112 and issue zero-copy request to service node 120 and/or service engine 122. As described herein, a zero-copy request may refer to a transaction or operation that is performed without a central processing unit (CPU) or processing resource copying data from one memory location to another memory location. In some examples, zero-copy request 130 may identify the duplicate data location with a pointer, an address, or other mechanism sufficient to identify the duplicate data location. Zero-copy request 130 may be based (at least in part) on the request 102 for which request engine 112 generated a request log entry 110 in request log 114.

In some examples, zero-copy request may be performed without using CPU-based or processing resource-based data copying via direct memory access (DMA) based copying and/or a memory management unit (MMU). In such examples, the duplicate data location identified by zero-copy request 130 may be in a memory area that can be accessed by request engine 112 on owner node 110, service engine 122 on service node 120, and a recover engine 132, as necessary.

Service node 120 may include service engine 122 to obtain or receive zero-copy request 130. Based (at least in part) on zero-copy request 130, service engine 122 may generate a service log entry 126 in a service log 124. A service log, in the examples described herein, may refer to a log of transactions associated with a service engine. In some examples, service log 124 may log all requests or transactions associated with service engine 122. In other examples, service log 124 may log all requests received at, initiated by, or otherwise associated with service node 120. In yet other examples, service log 122 may log all transactions associated with service node 120. As shown in FIG. 1A, service log 124 may be located at service node 120. A redundant copy of service log 124 may also be created at another node of multi-node cluster 100 such as owner node 110. In some examples, a redundant copy of service log 124 may be created at each node of multi-node cluster 100. In other examples, a redundant copy of service log 124 may be created at multiple, but not all, nodes of multi-node cluster 100. In some such examples, service log 124 may be mirrored to another node. Service log 124 may also be located separate or remote from, but accessible to multi-node cluster 100.

As shown in FIG. 1A, service log 124 may comprise numerous service log entries 126. As described herein, a service log entry refers to each entry within a service log. Each service log entry 126 may represent a particular request or transaction associated with service engine 122. In other examples, each service log entry 126 may represent a request or transaction associated with service node 120. Service log entry 126 may further identify the duplicate data location. As discussed above, the duplicate data location may refer to a duplicate or second storage area location for data that may be accessed by both request engine 112 on owner node 110 and a service engine 122 on service node 120. In some examples, service log entry 126 may identify the duplicate data location with a pointer, an address, or other mechanism sufficient to identify the duplicate data location.

In some examples, service engine 122 may process zero-copy request 130. In some such examples, processing zero-copy request 130 may involve performing the requested operation. In other such examples, for instance an example in which zero-copy request 130 may involve a write operation, service engine 122 may process zero-copy request 130 by passing the zero-copy request 130 and/or the data to be written to a queue, for example, a first-in-first-out queue or a priority queue, wherein the data is written per its placement in the queue or per its priority, respectively. In some examples, service engine 122 may then tag the duplicate data location with a serviced tag. A tag, as used herein, may refer to a bit or a series of bits associated with a memory location that indicates a specific action. For example, the serviced tag may indicate that a service engine has processed the zero-copy request related to the tagged duplicate data location. In some examples, the serviced tag may replace an earlier tag, the requested tag. In other examples, the serviced tag may be added without altering, clearing, or removing the requested tag.

A determine engine 132 may determine whether owner node 110 and service node 120 have failed. In some examples, determine engine 132 may receive or monitor fault or error messages to determine whether owner node 110 or service node 120 have failed. In other examples, determine engine 132 may query owner node 110 and/or service node 120 to determine whether either has failed. Determine engine 132 may be located on any surviving node in multi-node cluster 100. In some examples, determine engine 132 may be located on each node in multi-node cluster 100 or multiple, but not all, nodes within multi-node cluster 100. Determine engine 132 may also be located on any node in multi-node cluster 100, including both of owner node 110 and service node 120 or neither of owner node 110 and service node 120. In other examples, determine engine 132 may be separate or remote from, but capable of communicating with and accessible to the multi-node cluster 100.

Based (at least in part) on a determination that at least one of the owner node 110 and the service node 120 have failed, a recover engine 142 may recover a failed node via at least one of the requested tag and the serviced tag of the duplicate data location. Recover engine 142 may request, receive, or otherwise obtain information from determine engine 132 regarding failure of owner node 110 and/or service node 120. In some examples, recovery may involve reviewing, replaying, and/or analyzing request log entries 116 and/or service log entries 126 at the time of the failure or fault to ensure that the effects of a requested operation or transaction, i.e., request 102 and zero-copy request 130, persist in memory. In some such examples, recovery may involve undoing the effects of an incomplete requested operation or transaction to ensure the effects of an incomplete requested operation or transaction do not persist in memory.

Recover engine 142 may be located on any surviving node in multi-node cluster 100. In some examples, recover engine 142 may be located on each node in multi-node cluster 100 or multiple, but not all, nodes within multi-node cluster 100. Recover engine 142 may also be located on any node in multi-node cluster 100, including both of owner node 110 and service node 120 or neither of owner node 110 and service node 120. In other examples, recover engine 142 may be separate or remote from, but capable of communicating with and accessible to the multi-node cluster 100. In yet other examples, recover engine 142 may be located on the same node as determine engine 132.

Figure 1B:
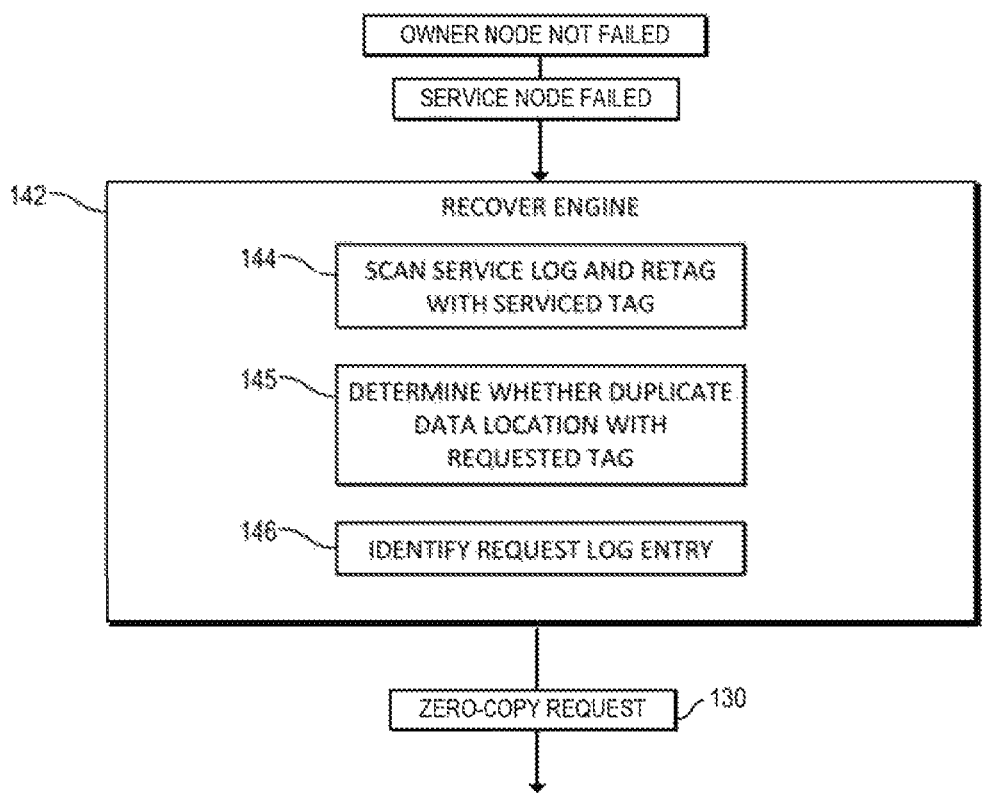
FIG. 1B is a block diagram of example recover engine of a multi-node cluster in which it has been determined that an owner node has not failed and that a service node has failed.

FIG. 1B further illustrates an example recover engine 142 of multi-node cluster 100 wherein determine engine 132 has determined that owner node 110 has not failed and that service node 120 has failed. Based (at least in part) on the determinations that owner node 110 has not failed, but that service node 120 has failed, recover engine 142 may, at 144, scan service log 124 and re-tag each duplicate data location identified in the service log with the serviced tag. In some examples, recover engine 142 may scan service log 124 by reviewing each service log entry 126 and analyzing each duplicate data location identified in each service log entry 126. Recover engine 142, in some examples, may re-tag each duplicate data location by removing or clearing any existing tag at the duplicate data location and replacing it with a serviced tag. In other examples, recover engine 142 may re-tag each duplicate date location by adding a serviced tag without removing any previous tags. In yet other examples, recover engine 142 may re-tag each duplicate data location by analyzing any existing tag at a duplicate data location, determining whether the existing tag is a serviced tag, and if it is not, replacing the tag with the serviced tag.

At 145, recover engine 142 may determine whether any duplicate data location remains tagged with a requested tag. In some examples, recover engine 142 may review each duplicate data location to determine whether any has a requested tag. In other examples, where each duplicate data location may have several tags, recover engine 142, may determine whether the latest or last tag of any duplicate data location is a requested tag.

Based (at least in part) on a determination that the duplicate data location is tagged with the requested tag, at 146, recover engine 142 may identify the request log entry 116 that identities the duplicate data location. In some examples, recover engine 142 may compare the duplicate data location against the duplicate data locations identified in request log 114 to identify the request log entry 118. Recover engine 142 may then reissue zero-copy request 130. In some examples, recover engine 142 may reissue zero-copy request 130 to a new service node and/or a new service engine on the new service node. In some examples, recover engine 142 may reissue zero-copy request 130 by reconstructing or regenerating the zero-copy request based (at least in part) on request log entry 116. Reissued zero-copy request 130 may identify the duplicate data location.

Figure 1C:
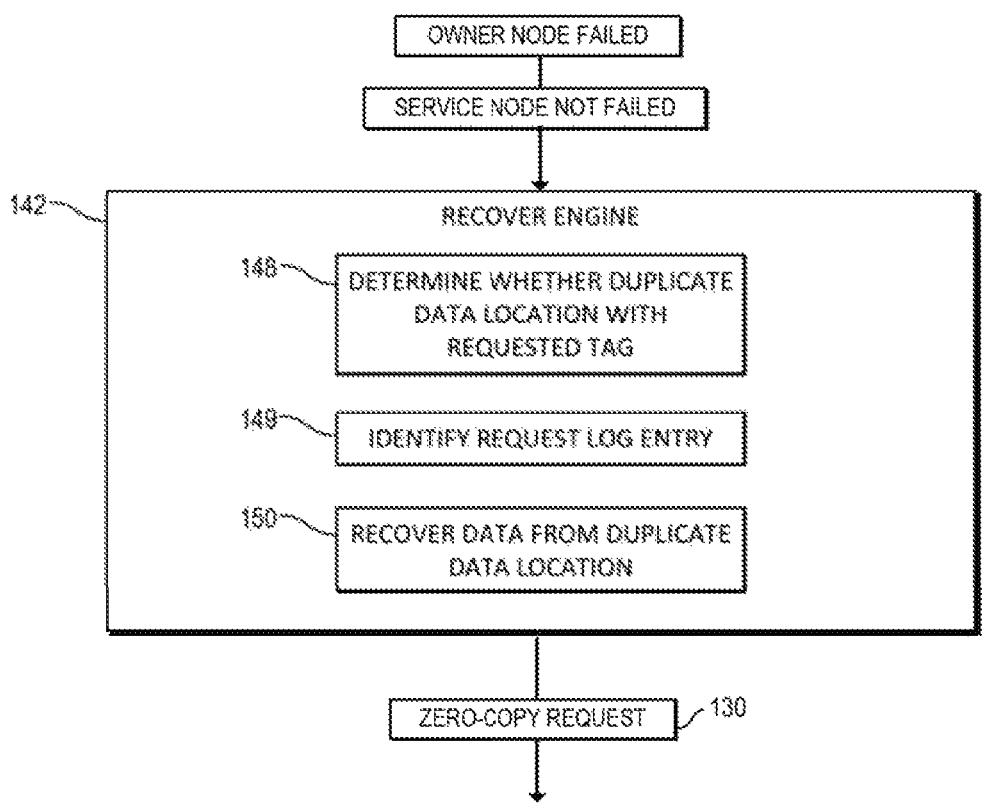
FIG. 1C is a block diagram of an example recover engine of a multi-node cluster in which it has been determined that an owner node has failed and that a service node has not failed.

FIG. 1C further illustrates an example recover engine 142 of multi-node cluster 100 wherein determine engine 132 has determined that owner node 110 has failed and that service node 120 has not failed. Based (at least in part) on the determinations that owner node 110 has failed and that service node 120 has not failed, recover engine 142 may, at 148, determine whether any duplicate data location is tagged with the requested tag. In some examples, recover engine 142 may review each duplicate data location to determine whether any has a requested tag. In other examples, where each duplicate data location may have several tags, recover engine 142 may determine whether the latest or last tag of any duplicate data location is a requested tag.

Based (at least in part) on a determination that the duplicate data location is tagged with the requested tag, at 149 recover engine 142 may identify the request entry 116 that identifies the duplicate data location. In some examples, recover engine 142 may compare the duplicate data location against the duplicate data locations identified in request log 114 to identify the request log entry 116. At 150, recover engine 142 may recover the data from the duplicate data location. In some examples, recover engine 142 may recover the data by copying and storing the data at another storage location. Recover engine 142 may then reissue zero-copy request 130. In some examples, recover engine 142 may reissue zero-copy request 130 to a service engine 120 and/or a service engine 122 on service node 120. In some examples, recover engine 142 may reissue zero-copy request 130 by reconstructing or regenerating the zero-copy request based (at least in part) on request log entry 116 and/or the recovered data. In some examples, the reissued zero-copy request identities the duplicate data location. In other examples, reissued zero-copy request 130 may identify the recovered data in its new location.

Multi-node cluster 100 may be implemented by at least two nodes and may include at least engines 112, 122, 132, and 142, which may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of multi-node cluster 100. In some examples, the at least one machine-readable storage medium may store instructions that, when executed by the at least one processing resource, at least partially implement some or all engines of multi-node cluster 100. In such examples, multi-node cluster 100 may include the at least one machine-readable storage medium storing the instructions and the at least one processing resource to execute the instructions.

In some examples, the instructions can be part of installation package that, when installed, can be executed by the at least one processing resource to at least partially implement at least some of the engines of multi-node cluster 100. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on nodes 110 and 120 that include a processing resource. In such examples, the machine-readable storage medium may include memory such as a hard drive, solid state drive, or the like. In other examples, the functionalities of any engines of multi-node cluster 100 may be at least partially implemented in the form of electronic circuitry. In some examples, functionalities described herein in relation to FIGS. 1A, 1B and 1C may be provided in combination with functionalities described herein in relation to any of FIGS. 2-5.

Figure 2A:
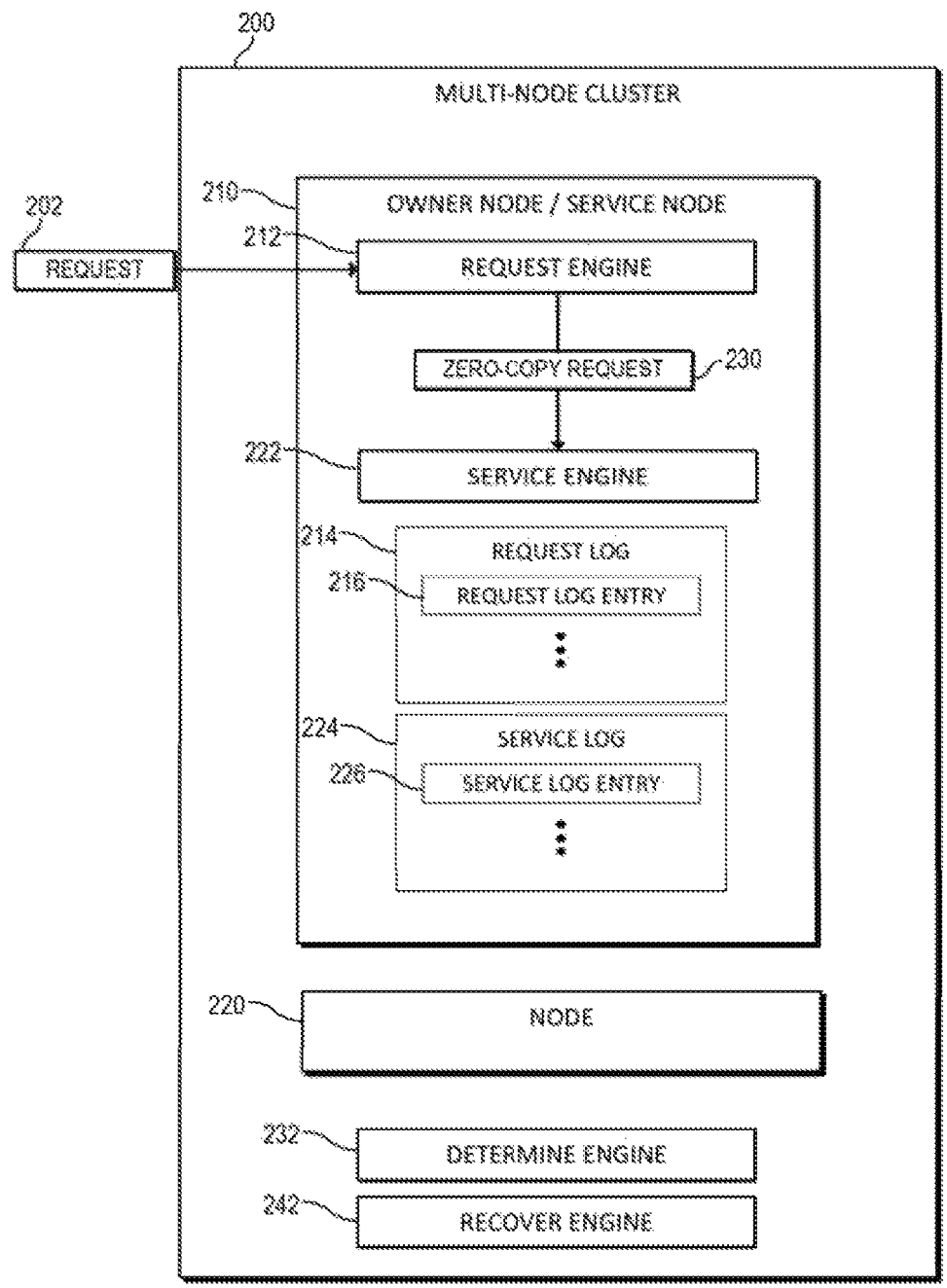
FIG. 2A is a block diagram of an example transaction management system for a multi-node cluster in which the owner node and the service node are a same node.

Further examples are described herein in relation to FIG. 2A, which is a block diagram of an example transaction management system for multi-node cluster 200. As described above, a multi-node cluster may refer to multiple nodes that work together as a single system. In some examples, each node of the multi-node cluster may utilize a same operating system configuration an a same or similar hardware configuration. In other examples, nodes of the multi-node cluster may utilize differing operating system configurations or differing hardware configurations. A node may be any networking or computing device suitable for execution of the functionality described below. As used herein, a node may be a desktop computer, laptop (or notebook) computer, workstation, tablet computer, mobile phone, smart device, switch, router, server, blade enclosure, or any other processing device or equipment including a processing resource.

Multi-node cluster 200 comprises an owner node/service node 210 and node 220. As shown in FIG. 2A, the functionalities of an owner node and a service node are performed by a single or same node, owner node/service node 210, which both owns and manages a particular request and services and processes the request. Nodes 210 and 220 may be any networking or computing device suitable for execution of the functionality described below. Multi-node cluster 200 and nodes 210 and 220 may be implemented at least in part by engines 212, 222, 232, and 242, which may be any combination of hardware and programming to implement the functionalities of the engines described herein. Although two nodes 210 and 220 are illustrated in FIG. 2A, in examples described herein, a multi-node cluster may involve any suitable number of nodes more than one.

Owner node/service node 210 may include a request engine 212, which may receive a request 202 and generate a request log entry 216 in a request log 214. As discussed above, a request may represent a transaction or operation to be performed by the multi-node cluster 200. As an example, request 202 may be a request to perform a write operation. A request log, in the examples described herein, may refer to a log of transactions associated with a request log. In some examples, request log 214 may log all requests or transactions associated with request engine 212. As shown in FIG. 2A, request log 214 may be located at owner node/service node 210. A redundant copy of request log 214 may also be created at another node of multi-node cluster 200 such as node 120. In some examples, a redundant copy of request log 214 may be created at each node of multi-node cluster 200. In other examples, a redundant copy of request log 214 may be created at multiple, but not all, nodes of multi-node cluster 200. In some such examples, request log 214 may be mirrored to another node. Request log 214 may also be located separate or remote from, but accessible to multi-node cluster 200.

As shown in FIG. 2A, request log 214 may comprise numerous request log entries 216. As described herein, a request log entry refers to each entry within a request log. Each request log entry 216 may represent a particular request or transaction associated with request engine 212. Request log entry 216 may further identify a duplicate data location. A duplicate data location, as discussed above, may refer to a duplicate or second storage area location for data that may be accessed by both request engine 212 and a service engine 222. In some examples, request log entry 216 may identify the duplicate data location with a pointer, an address, or other mechanism sufficient to identify the duplicate data location.

After generating request log entry 216 in request log 214, request engine 212 may tag the duplicate data location with a requested tag. A tag, as used herein, may refer to a bit or a series of bits associated with a memory location that indicates a specific action. For example, the requested tag may indicate that a request engine has received a request, i.e., request 202, related to the tagged duplicate data location. Request engine 212 may then issue (e.g., generate, send) a zero-copy request 230 that identifies the duplicate data location to a service engine 222. As discussed above, a zero-copy request may refer to a transaction or operation that is performed without a central processing unit (CPU) or processing resource copying data from one memory location to another memory location. In some examples, zero-copy request 230 may identify the duplicate data location with a pointer, an address, or other mechanism sufficient to identify the duplicate data location. Zero-copy request 230 may be based (at least in part) on request 202 for which request engine 212 generated a request log entry 216 in request log 214.

In some examples, zero-copy request 230 may be performed without using CPU-based or processing resource-based data copying via direct memory access (DMA) based copying and/or a memory management unit (MMU). In such examples, the duplicate data location identified by zero-copy request 230 may be in a memory area that can be accessed by both request engine 212 and service engine 222.

Owner node/service node 120 may also include service engine 222 to obtain or receive zero-copy request 230. Based (at least in part) on zero-copy request 230, service engine 222 may generate a service log entry 226 in a service log 224. A service log, in the examples described herein, may refer to a log of transactions associated with a service engine. In some examples, service log 224 may log all requests or transactions associated with service engine 222. As shown in FIG. 2A, service log 224 may be located at owner node/service node 210. A redundant copy of service log 224 may also be created at another node of multi-node cluster 200 such as node 220. In some examples, a redundant copy of service log 224 may be created at each node of multi-node cluster 200. In other examples, a redundant copy of service log 224 may be created at multiple, but not all, nodes of multi-node cluster 200. In some such examples, service log 224 may be mirrored to another node. Service log 224 may also be located separate or remote from, but accessible to multi-node cluster 200.

As shown in FIG. 2A, service log 224 may comprise numerous service log entries 226. As described above, a service log entry refers to each entry within a service log. Each service log entry 226 may represent a particular request or transaction associated with service engine 222. Service log entry 226 may further identify the duplicate data location. In some examples, service log entry 226 may identify the duplicate data location with a pointer, an address, or other mechanism sufficient to identify the duplicate data location.

In some examples, service engine 222 may process zero-copy request 230. In some such examples, processing zero-copy request 230 may involve performing the requested operation. In other such examples, for instance an example in which zero-copy request 230 may involve a write operation, service engine 222 may process zero-copy request 230 by passing the zero-copy request 230 and/or the data to be written to a queue, for example, a first-in-first-out queue or a priority queue, wherein the data is written per its placement in the queue or per its priority, respectively. In some examples, service engine 222 may then tag the duplicate data location with a serviced tag. For example, the serviced tag may indicate that a service engine has processed the zero-copy request related to the tagged duplicate data location. In some examples, the serviced tag may replace an earlier tag, the requested tag. In other examples, the serviced tag may be added without altering, clearing, or removing the requested tag.

A determine engine 232 may determine whether owner node/service node 210 has failed. Determine engine 232 may also determine whether node 220 has failed. In some examples, determine engine 232 may receive or monitor fault or error messages to determine whether owner node/service node 210 and/or node 220 have failed. In other examples, determine engine 232 may query owner node/service node 210 and/or node 220 to determine whether either has failed. Determine engine 232 may be located on any surviving node in multi-node cluster 200. In some examples, determine engine 232 may be located on each node in multi-node cluster 200 or multiple, but not all, nodes within multi-node cluster 200. Determine engine 232 may also be located on any node in multi-node cluster 200, including both of owner node/service node 210 and node 220 or neither of owner node/service node 210 and node 220. In other examples, determine engine 232 may be separate or remote from, but capable of communicating with and accessible to the multi-node cluster 200.

Based (at least in part) on a determination that owner node/service node 210 has failed, a recover engine 242 may recover the failed node via at least one of the requested tag and the serviced tag of the duplicate data location. Recover engine 242 may request, receive, or otherwise obtain information from determine engine 232 regarding failure of owner node/service node 210 and/or node 220. In some examples, recovery may involve reviewing, replaying, and/or analyzing request log entries 216 and/or service log entries 226 at the time of the failure or fault to ensure that the effects of requested operation or transaction, i.e., request 202 and zero-copy request 230, persist in memory. In some such examples, recovery may involve undoing the effects of an incomplete requested operation or transaction to ensure the effects of an incomplete requested operation or transaction do not persist in memory.

Recover engine 242 may be located on any surviving node in multi-node cluster 200. In some examples, recover engine 242 may be located on each node in multi-node cluster 200 or multiple, but not all, nodes within multi-node cluster 200. Recover engine 242 may also be located on any node in multi-node cluster 200, including both of owner node/service node 210 and node 220 or neither of owner node/service node 210 and node 220. In other examples, recover engine 242 may be separate or remote from, but capable of communicating with and accessible to the multi-node cluster 200. In yet other examples, recover engine 242 may be located on the same node as determine engine 232.

Figure 2B:
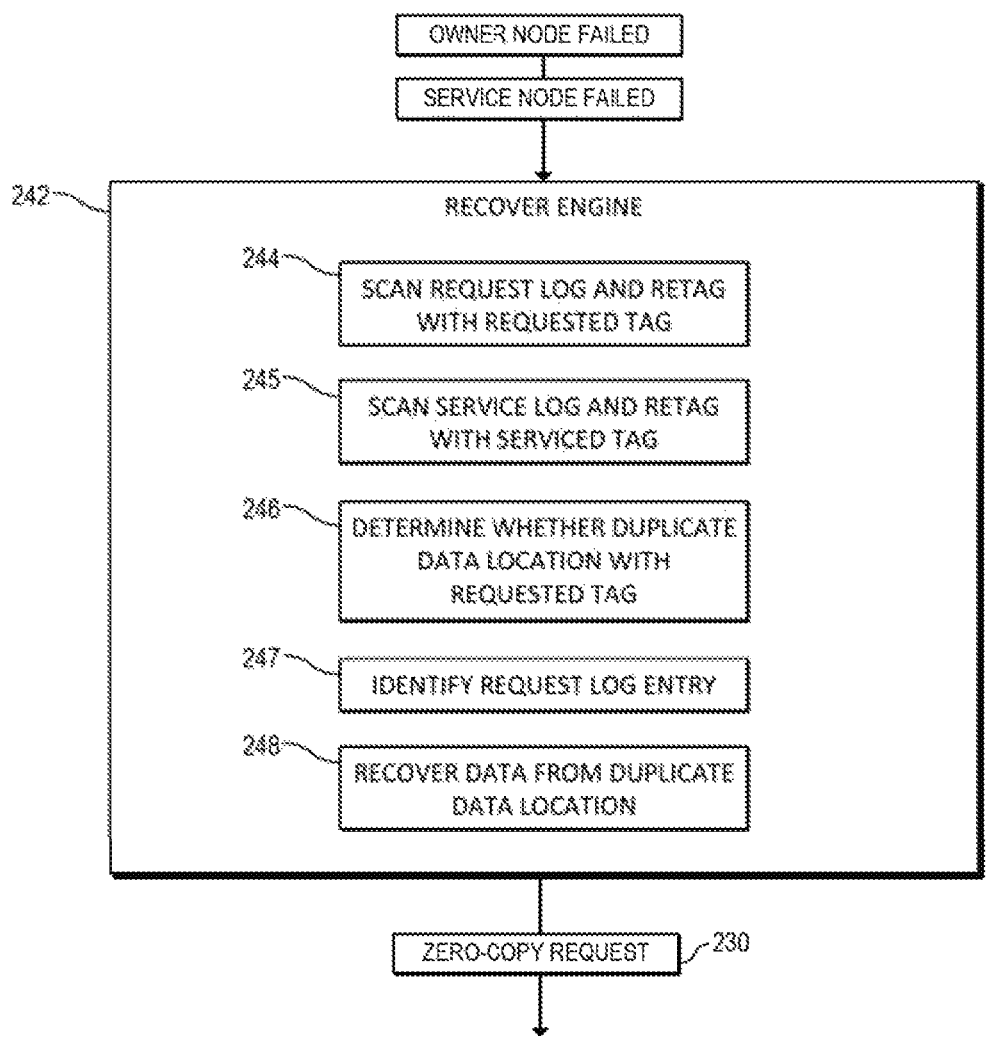
FIG. 2B is a block diagram of an example recover engine of a multi-node cluster in which it has been determined that an owner node and that a service node have failed, wherein the owner node and the service node are the same node.

FIG. 2B further illustrates an example recover engine 242 of multi-node cluster 200 wherein determine engine 232 has determined that the owner node and the service node (i.e., owner node/service node 210) have failed. Based (at least in part) on the determination that owner node/service node 210 has failed, recover engine 242 may, at 244, scan request log 214 and re-tag each duplicate data location identified in the request log with the requested tag. In some examples, recover engine 242 may scan request log 214 by accessing and reviewing each request log entry 216 and analyzing each duplicate data location identified in each request log entry 216. Recover engine 242, in some examples, may re-tag each duplicate data location by removing or clearing any existing tag at the duplicate data location and replacing it with a requested tag. In other examples, recover engine 242 may re-tag each duplicate data location by adding a requested tag without removing any previous tags. In yet other examples, recover engine 242 may re-tag each duplicate data location by analyzing any existing tag at a duplicate data location, determining whether the existing tag is a requested tag, and if it is not, replacing the tag with the requested tag.

At 245, recover engine 242 may also scan service log 224 and re-tag each duplicate data location identified in the service log with the serviced tag. In some examples, recover engine 242 may scan service log 224 by reviewing each service log entry 226 and analyzing each duplicate data location identified in each service log entry 226. Recover engine 242, in some examples, may re-tag each duplicate data location by removing or clearing any existing tag at the duplicate data location and replacing it with a serviced tag. In other examples, recover engine 242 may re-tag each duplicate data location by adding a serviced tag without removing any previous tags. In yet other examples, recover engine 242 may re-tag each duplicate data location by analyzing any existing tag at a duplicate data location, determining whether the existing tag is a serviced tag, and if it is not, replacing the tag with the serviced tag.

At 246, recover engine 242 may determine whether any duplicate data location remains tagged with a requested tag. In some examples, recover engine 242 may review each duplicate data location to determine whether any has a requested tag. In other examples, where each duplicate data location may have several tags, recover engine 242 may determine whether the latest or last tag of any duplicate data location is a requested tag.

Based (at least in part) on a determination that the duplicate data location is tagged with the requested tag, at 247, recover engine 242 may identify the request log entry 216 that identifies the duplicate data location. In some examples, recover engine 242 may compare the duplicate data location against the duplicate data locations identified in request log 214 to identify the request log entry 216.

At 246, recover engine 242 may recover the data from the duplicate data location. In some examples, recover engine 242 may recover the data by copying and storing the data at another storage location. Recover engine 242 may then reissue zero-copy request 230. In some examples, recover engine 242 may reissue zero-copy request 230 to a new service engine on a new, surviving node such as node 220. In some examples, recover engine 242 may reissue zero-copy request 230 by reconstructing or regenerating the zero-copy request based (at least in part) on request log entry 216 and/or the recovered data. In some examples, the reissued zero-copy request identifies the duplicate data location. In other examples, reissued zero-copy request 230 may identify the recovered data in its new location.

Multi-node cluster 200 may be implemented by at least two nodes and may include at least engines 212, 222, 232, and 242, which may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of multi-node cluster 200. In some examples, the at least one machine-readable storage medium may store instructions that, when executed by the at least one processing resource, at least partially implement some or all engines of multi-node cluster 200. In such examples, multi-node cluster 200 may include the at least one machine-readable storage medium storing the instructions and the at least one processing resource to execute the instructions.

In some examples, the instructions can be part of an installation package that, when installed, can be executed by the at least one processing resource to at least partially implement at least some of the engines of multi-node cluster 200. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on nodes 210 and 220 that include a processing resource. In such examples, the machine-readable storage medium may include memory such as a hard drive, solid state drive, or the like. In other examples, the functionalities of any engines of multi-node cluster 200 may be at least partially implemented in the form of electronic circuitry. In some examples, functionalities described herein in relation to FIGS. 2A and 2B may be provided in combination with functionalities described herein in relation to any of FIGS. 1 and 3-5.

Figure 3:
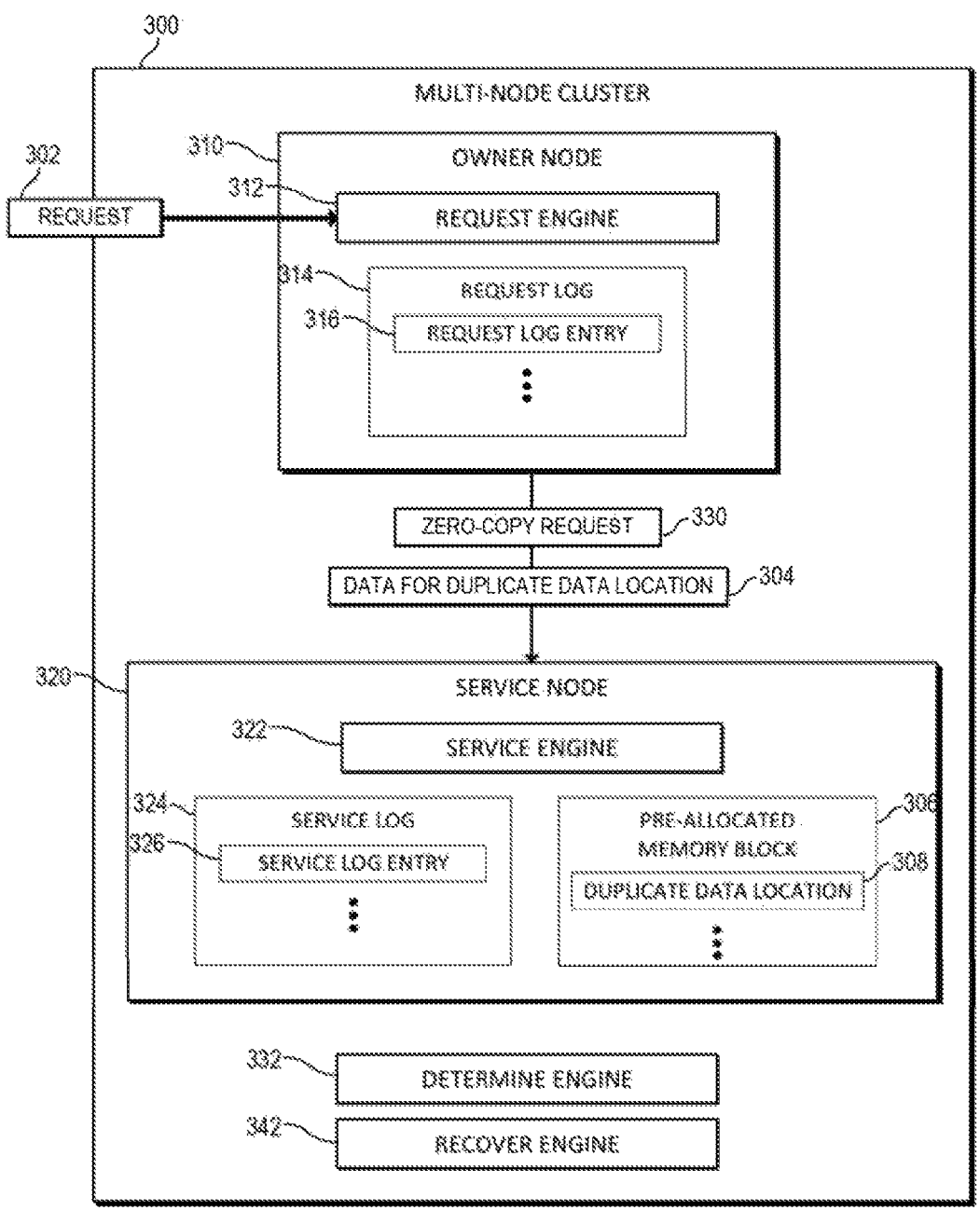
FIG. 3 is a block diagram of an example transaction management system for a multi-node cluster in which a duplicate data location is associated with a pre-allocated memory block.

Further examples are described herein in relation to FIG. 3, which is a block diagram of an example transaction management system for multi-node cluster 300. As described above, a multi-node cluster may refer to multiple nodes that work together as a single system. In some examples, each node of the multi-node cluster may utilize a same operating system configuration and a same or similar hardware configuration. In other examples, nodes of the multi-node cluster may utilize differing operating system configurations or differing hardware configurations. A node may be any networking or computing device suitable for execution of the functionality described below. As used herein, a node may be a desktop computer, laptop (or notebook) computer, workstation, tablet computer, mobile phone, smart device, switch, router, server, blade enclosure or any other processing device or equipment including, a processing resource.

Multi-node cluster 300 may comprise an owner node 310 and a service node 320. Owner node 310 may refer to a node within multi-node cluster 300 that owns or manages a particular request, i.e., request 302. Service node 320 may refer to a node within multi-node cluster 300 that services or processes a particular request. In some examples, nodes 310 and 320 within multi-node cluster 300 may communicate via a computer network (e.g., Internet, Local Area Network (LAN), Wide Area Network (WAN), etc.). Although two nodes 310 and 320 are illustrated in FIG. 3, in examples described herein a multi-node cluster may involve any suitable number of nodes more than one. Although not shown, owner node 310 and service node 320 may also be located on a single or same node. In such an example, the functionalities of owner node 310 and service node 320 are performed by the same node, which both owns and manages a particular request and services and processes the request.

Owner node 310 may include a request engine 312, which may receive a request 302. In the examples described herein, a request may represent a transaction or operation to be performed by the multi-node cluster 300. In some examples request 302 may contain data. For example, request 302 may contain data and be a request to perform a write operation involving the data. In some examples, request engine 312 may store the data contained in request 302 at owner node 310. Request engine 312 may further duplicate the data at a duplicate data location. A duplicate data location, as described herein, may refer to duplicate or second storage area location for data that may be accessed by both request engine 312 on owner node 310, service engine 322 on service node 320, and a recover engine 332, as necessary. In some examples, request engine 312 may duplicate the data by sending data 304 to service node 320 for storage at a duplicate data location 308 within service node 320. In other examples, request engine 312 may duplicate the data via mirroring.

As shown in FIG. 3, duplicate data location 308 may be located within a pre-allocated memory block 306 at service node 320 to which both request engine 312 and service engine 322 have access. As used in examples herein, a pre-allocated memory block may refer to a block of memory that was allocated prior to its use and may be accessed by a request engine, a service engine, and a recover engine, as necessary. A pre-allocated memory block may be allocated temporarily or for a fixed amount of time. In some examples, duplicate data location 308 may be located in a pre-allocated memory block at another node (e.g., other than service node 320) within multi-node cluster 300. For instance, where owner node 310 and service node 320 may be the same node, duplicate data location 308 may be located in another node within multi-node cluster 300.

Request engine 312 may generate a request log entry 316 in a request log 314. A request log, in the examples described herein, may refer to a log of transactions associated with a request engine. In some examples, request log 314 may log all requests received at, initiated by, or otherwise associated with owner 310. In other examples, request log 314 may log all transactions associated with owner node 310. In yet other examples, request log 314 may log all requests or transactions associated with request engine 312. As shown in FIG. 3, request log 314 may be located at owner node 310. A redundant copy of request log 314 may also be created at another node of multi-node cluster 300 such as service node 320. In some examples, a redundant copy of request log 314 may be created at each node of multi-node cluster 300. In other examples, a redundant copy of request log 314 may be created at multiple, but not all, nodes of multi-node cluster 300. In some such examples, request log 314 may be mirrored to another node. Request log 314 may also be located separate or remote from, but accessible to multi-node cluster 300.

As shown in FIG. 3, request log 314 may comprise numerous request log entries 316. Each request log entry 316 may represent a particular request or transaction associated with request engine 312. In other examples, each request log entry 316 may represent a request or transaction associated with owner node 310. Request log entry 316 may further identify the duplicate data location 308. In some examples, request log entry 316 may identify duplicate data location 308 with a pointer, an address, or other mechanism sufficient to identify the duplicate data location.

After generating request log entry 316 in request log 314, request engine 312 may tag duplicate data location 308 with a requested tag. For example, the requested tag may indicate that a request engine has received a request, i.e., request 302, related to the tagged duplicate data location. Request engine 312 may then issue (e.g., generate, send) a zero-copy request 330 that identifies duplicate data location 308. In some examples, request engine 312 may issue zero-copy request 330 to service node 320 and/or a service engine 322 located on service node 320. In other examples, owner node 310 may receive zero-copy request 330 from request engine 312 and issue zero-copy request to service node 320 and/or service engine 322. As described herein, a zero-copy request may refer to a transaction or operation that is performed without a central processing unit (CPU) or processing resource copying data from one memory location to another memory location. In some examples, zero-copy request 330 may identify duplicate data location 308 with a pointer, an address, or other mechanism sufficient to identify the duplicate data location. Zero-copy request 330 may be based (at least in part) on the request 302 for which request engine 312 generated a request log entry 316 in request log 314.

In some examples, zero-copy request 330 may be performed without using CPU-based or processing resource-based data copying via direct memory access (DMA) based copying and/or a memory management unit (MMU). In such examples, duplicate data location 308 identified by zero-copy request 330 may be in a memory area such as pre-allocated memory block 306 that can be accessed by request engine 312 on owner node 310, service engine 322 on service node 320, and recover engine 342, as necessary.

Service node 320 may include service engine 322 to obtain: or receive zero-copy request 330. Based (at least in part) on zero-copy request 330, service engine 322 may generate a service log entry 326 in a service log 324. A service log, in the examples described herein, may refer to a log of transactions associated with a service engine. In some examples, service log 324 may log all requests or transactions associated with service engine 322. In other examples, service log 324 may log all requests received at, initiated by, or otherwise associated with service node 320. In yet other examples, service log 322 may log all transactions associated with service node 320. As shown in FIG. 3, service log 324 may be located at service node 320. A redundant copy of service log 324 may also be created at another node of multi-node cluster 300 such as owner node 310. In some examples, a redundant copy of service log 324 may be created at each node of multi-node cluster 300. In other examples, a redundant copy of service log 324 may be created at multiple, but not all, nodes of multi-node cluster 300. In some such examples, service log 324 may be mirrored to another node. Service log 324 may also be located separate or remote from, but accessible to multi-node cluster 300.

As shown in FIG. 3, service log 324 may comprise numerous service log entries 326. As described herein, a service log entry refers to each entry within a service log. Each service log entry 326 may represent a particular request or transaction associated with service engine 322. In other examples, each service log entry 326 may represent a request or transaction associated with service node 320. Service log entry 326 may further identify duplicate data location 308. As discussed above, the duplicate data location may refer to a duplicate or second storage area location for data that may be accessed by request engine 312 on owner node 310, a service engine 322 on service node 320, and a recover engine 332, as necessary. In some examples, service log entry 326 may identify duplicate data location 308 with a pointer, an address, or other mechanism sufficient to identify the duplicate data location.

In some examples, service engine 322 may process zero-copy request 330. In some such examples, processing zero-copy request 330 may involve performing the requested operation. In other such examples, for instance an example in which zero-copy request 330 may involve a write operation, service engine 322 may process zero-copy request 330 by passing the zero-copy request 330 and/or the data be written to a queue, for example, a first-in-first-out queue or a priority queue, wherein the data is written per its placement in the queue or per its priority, respectively. In some examples, service engine 322 may then tag duplicate data location 308 with a serviced tag. A tag, as used herein, may refer to a bit or a series of bits associated with a memory location that indicates a specific action. For example, the serviced tag may indicate that a service engine has processed the zero-copy request related to the tagged duplicate data location. In some examples, the serviced tag may replace an earlier tag, the requested tag. In other examples, the serviced tag may be added without altering, clearing, or removing the requested tag.

A determine engine 332 may determine whether owner node 310 and service node 320 have failed. In some examples, determine engine 332 may receive or monitor fault or error messages to determine whether owner node 310 or service node 320 have failed. In other examples, determine engine 332 may query owner node 310 and/or service node 320 to determine whether either has failed. Determine engine 332 may be located on any surviving node in multi-node cluster 300. In some examples, determine engine 332 may be located on each node in multi-node cluster 300 or multiple, but not all, nodes within multi-node cluster 300. Determine engine 332 may also be located on any node in multi-node cluster 300, including both of owner node 310 and service node 320 or neither of owner node 310 and service node 320. In other examples, determine engine 332 may be separate or remote from, but capable of communicating with and accessible to the multi-node cluster 300.

Based (at least in part) on a determination that at least one of the owner node 310 and the service node 320 have failed, a recover engine 342 may recover a failed node via at least one of the requested tag and the serviced tag of the duplicate data location. Recover engine 342 may request, receive, or otherwise obtain information from determine engine 332 regarding failure of owner node 310 and/or service node 320. In some examples, recovery may involve reviewing, replaying, and/or analyzing request log entries 316 and/or service log entries 326 at the time of the failure or fault to ensure that the effects of a requested operation or transaction, i.e., request 302 and zero-copy request 330, persist in memory. In some such examples, recovery may involve undoing the effects of an incomplete requested operation or transaction to ensure the effects of an incomplete requested operation or transaction do not persist in memory.

Recover engine 342 may be located on any surviving node in multi-node cluster 300. In some examples, recover engine 342 may be located on each node in multi-node cluster 300 or multiple, but not all, nodes within multi-node cluster 300. Recover engine 342 may also be located on any node in multi-node cluster 300, including both of owner node 310 and service node 320 or neither of owner node 310 and service node 320. In other examples, recover engine 342 may be separate or remote from, but capable of communicating with and accessible to the multi-node cluster 300. In yet other examples, recover engine 342 may be located on the same node as determine engine 332.

Multi-node cluster 300 may be implemented by at least two nodes and may include at least engines 312, 322, 332, and 342, which may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of multi-node cluster 300. In some examples, the at least one machine-readable storage medium may store instructions that, when executed by the at least one processing resource, at least partially implement some or all engines of multi-node cluster 300. In such examples, multi-node cluster 300 may include the at least one machine-readable storage medium storing the instructions and the at least one processing resource to execute the instructions.

In some examples, the instructions can be part of an installation package that, when installed, can be executed by the at least one processing resource to at least partially implement at least some of the engines of multi-node cluster 300. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on nodes 310 and 320 that include a processing resource. In such examples, the machine-readable storage medium may include memory such as a hard drive, solid state drive, or the like. In other examples, the functionalities of any engines of multi-node cluster 300 may be at least partially implemented in the form of electronic circuitry. In some examples, functionalities described herein in relation to FIG. 3 may be provided in combination with functionalities described herein in relation to any of FIGS. 1-2 and 4-5.

Figure 4A:
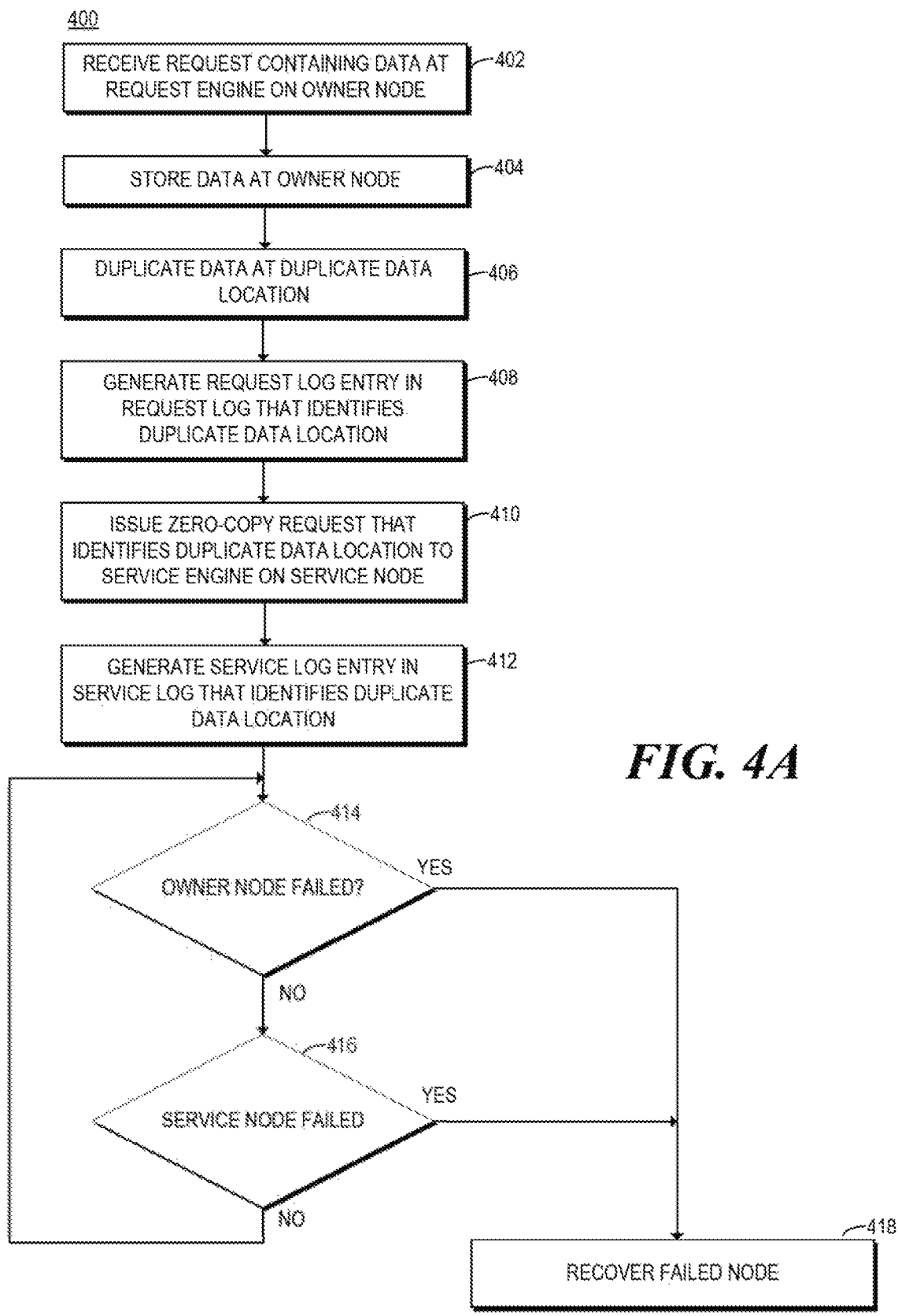
FIG. 4A is a flowchart of an example method of managing transactions for a multi-node cluster including receiving a request, storing data at an owner node, and duplicating data at a duplicate data location.

FIG. 4A is a flowchart of a an example method 400 of managing transactions for a multi-node cluster including receiving a request, storing data at an owner node, and duplicating data at a duplicate data location. Execution of method 400 is described below with reference to various features of multi-node cluster 300 of FIG. 3, respectively, but other suitable systems for the execution of method 400 can also be utilized (e.g., multi-node cluster 100 of FIG. 1, multi-node cluster 200 of FIG. 2). Additionally, implementation of method 400 is not limited to such examples.

In the example of FIG. 4A, method 400 may be a method of multi-node cluster 300. At 402, request engine 312 may receive a request 302 containing data at owner node 310. This receipt may be performed as described above in relation to request engine 312 of FIG. 3. At 404, request engine 312 may store the data at owner node 310. At 406, request engine 312 may duplicate the data duplicate data location 308. This storage and duplication may be performed as described above in relation to request engine 312 of FIG. 3. At 408, request engine 312 may generate request log entry 316 in request log 314 that identifies duplicate data location 308. This generation may be performed as described above in relation to request engine 213 of FIG. 3. At 410, request engine 312 may issue zero-copy request 330 that identifies duplicate data location 308 to service engine 322 located on service node 320. This issuing of a zero-copy request may be performed as described above in relation to request engine 312 of FIG. 3.

At 412 of method 400, a service engine 322 may receive zero-copy request 330 and generate a service log entry 326 in service log 324 that identifies duplicate data location 308. This generation of a service log entry may be performed as described above in relation to service engine 322 of FIG. 3. At 414 and 416, a determine engine 332 may determine whether owner node 310 has failed and whether service node 320 has failed. These determinations may be performed as described above in relation to determine engine 332 of FIG. 3. If it is determined that neither owner node 310 nor service node 320 have failed, method 400 may return to 414 and determine engine 332 may continue to monitor or query the nodes for any faults or failures, as described above in relation to determine engine 332 of FIG. 3. If it is determined that at least one of owner node 310 and 320 have failed, method 400 may proceed to 418, where recover engine 342 may recover a failed node via at least one of a requested tag and a serviced tag of duplicate data location 308. Recovery may be performed as described above in relation to recover engine 342 of FIG. 3.

Although the flowchart of FIG. 4A shows a specific order of performance of certain functionalities, method 400 may not be limited to that order. For example, the functionalities shown in succession in the flowchart may be performed in a different order, may be executed concurrently or with partial concurrence, or a combination thereof. In some examples, functionalities described herein in relation to FIG. 4A may be provided in combination with functionalities described herein in relation to any of FIGS. 1-2, 4B-D, and 5.

Figure 4B:
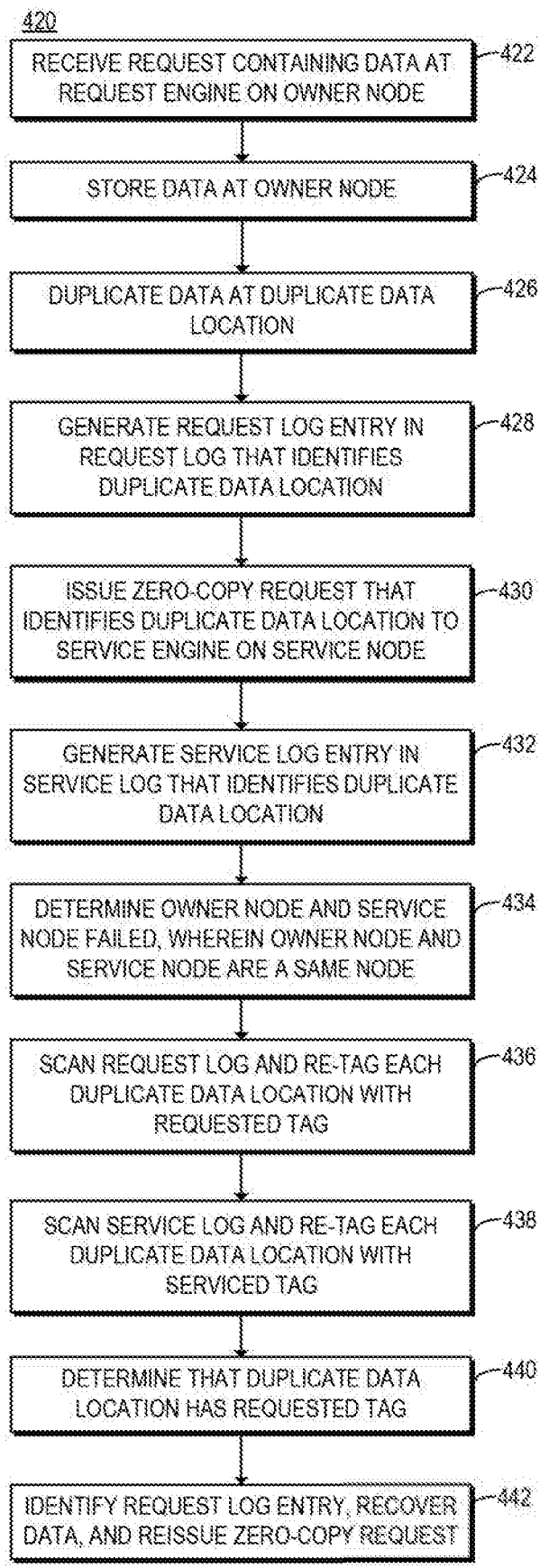
FIG. 4B a flowchart of an example method of managing transactions for a multi-node cluster including determining that the owner node and service node have failed, wherein the owner node and the service node are the same node, recovering data, and reissuing the zero-copy request.

FIG. 4B is a flowchart of an example method 420 of managing transactions for a multi-node cluster including determining that the owner node and service node have failed, wherein the owner node and the service node are the same node, recovering data, and reissuing the zero-copy request. Execution of method 420 is described below with reference to various features of multi-node clusters 200 and 300 of FIGS. 2 and 3, respectively. These features of multi-node clusters 200 and 300 may be utilized together as described in method 420. Other suitable systems for the execution of method 420 can also be utilized (e.g., multi-node cluster 100 of FIG. 1). Additionally, implementation of method 420 is not limited to such examples.

In the example of FIG. 4B, method 420 may be a method of multi-node clusters 200 and 300. At 422, request engine 212 may receive a request 202 containing data at owner node/service node 210. This receipt may be performed similarly to the receipt of request 302 at request engine 312 at owner node 310 of FIG. 3, as described above. This receipt may also be performed as described above in relation to request engine 212 of FIG. 2A.

At 424, request engine 212 may store the data at owner node/service node 210, similar to the manner in which request engine 312 may store the data at owner node 310, as described above in relation to request engine 312 of FIG. 3. At 426, request engine 212 may duplicate the data at a duplicate data location on another node, such as node 220, similar to the manner in which request engine 312 may duplicate the data at a duplicate data location 308 on service node 320, as described above in relation to request engine 312 of FIG. 3.

At 428, request engine 212 may generate request log entry 216 in request log 214 that identifies the duplicate data location. This generation may be performed similarly to the generation of request log entry 318 in request log 314 that identifies duplicate data location 308, as described above in relation to request engine 312 of FIG. 3. This generation may also be performed as described above in relation to request engine 212 of FIG. 2A. At 430, request engine 212 may issue a zero-copy request 230 that identifies the duplicate data location to service engine 222 on owner node/service node 210. This issuance may be performed similarly to the issuance of zero-copy request 330 that identifies duplicate data location 308 to service engine 322 on service node 320, as described above in relation to request engine 312 of FIG. 3. This issuance may also be performed as described above in relation to request engine 212 of FIG. 2A.

At 432 of method 420, service engine 222 may receive zero-copy request 230 and generate a service log entry 226 in service log 224 that identifies the duplicate data location.

This receipt and generation may be performed similarly to the receipt of zero-copy request 330 and generation of a service log entry 326 in service log 324 that identifies duplicate data location 308, as described above in relation to service engine 322 of FIG. 3. This generation of a service log entry may also be performed as described above in relation to service engine 222 of FIG. 2A.

At 434, determine engine 232 may determine that owner node/service node 210 has failed. This determination may be performed similarly to the determination that owner node 310 and service node 320 have failed, as described above in relation to determine engine 322 of FIG. 3. This determination may also be performed as described above in relation to determine engine 232 of FIG. 2A. Based on the determination that owner node/service node 210 has failed, at 436, recover engine 242 may scan request log 214 and re-tag each duplicate data location with a requested tag. This scanning and re-tagging may be performed as described above in relation to 244 of FIG. 2B. At 438, recover engine 242 may scan service log 224 and re-tag each duplicate data location with a serviced tag. This scanning and re-tagging may be performed as described above in relation to 245 of FIG. 2B. At 440, recover engine 242 may determine that a duplicate data location has a requested tag. This determination may be performed as described above in relation to 246 of FIG. 2B. At 442, recover engine 242 may identify the request log entry 216 in the request log 214 that identifies the duplicate data location, recover the data from the duplicate data location, and reissue zero-copy request 230. The identification of request log entry 216 may be performed as described above in relation to 247 of FIG. 2B. The recovery of data from the duplicate data location may be performed as described above in relation to 248 of FIG. 2B. Reissuance of zero-copy request 230 may be performed as described above in relation to FIG. 2B.

Although the flowchart of FIG. 4B shows a specific order of performance of certain functionalities, method 420 may not be limited to that order. For example, the functionalities shown in succession in the flowchart may be performed in a different order, may be executed concurrently or with partial concurrence, or a combination thereof. In some examples, functionalities described herein in relation to FIG. 4B may be provided in combination with functionalities described herein in relation to any of FIGS. 1, 4A, 4C-D, and 5.

Figure 4C:
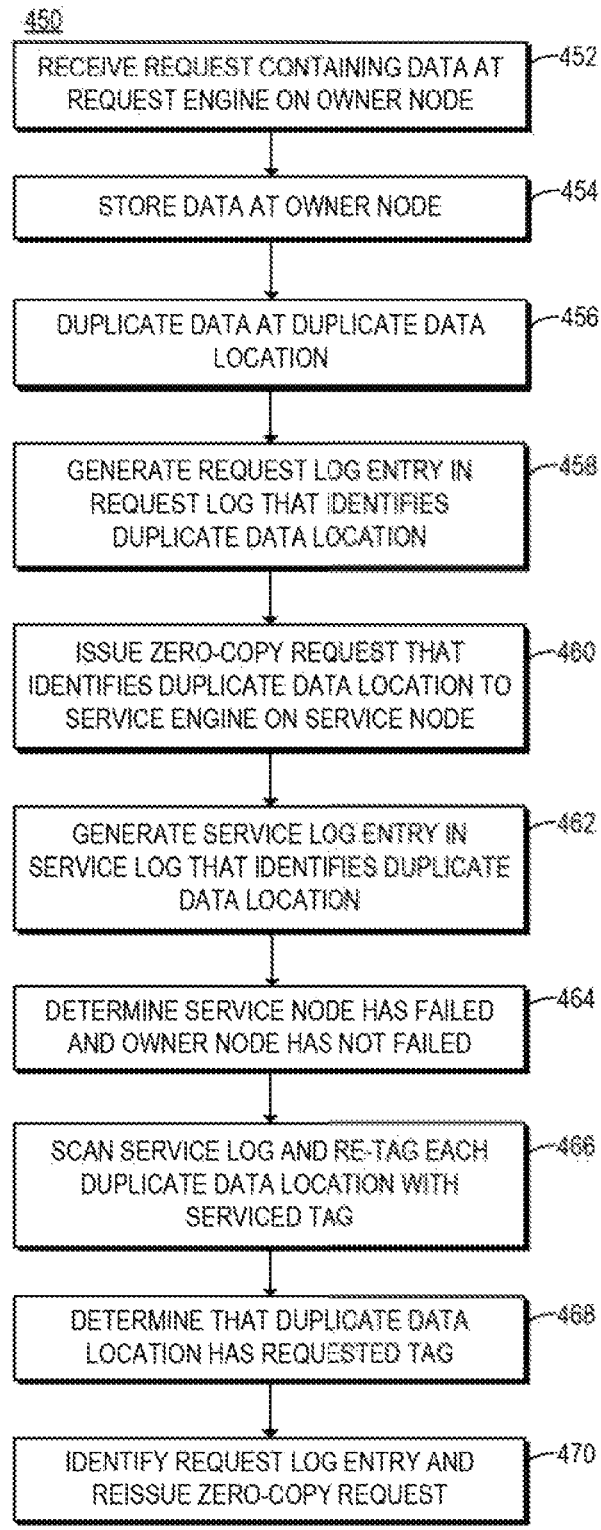
FIG. 4C is a flowchart of an example method of managing transactions for a multi-node cluster including determining that the owner node has not failed, determining that the service node has failed, and reissuing the zero-copy request.

FIG. 4C is a flowchart of an example method 450 of managing transactions for a multi-node cluster including determining that the owner node has not failed, determining that the service node has failed, and reissuing the zero-copy request. Execution of method 450 is described below with reference to various features of multi-node clusters 100 and 300 of FIGS. 1 and 3, respectively. These features of multi-node clusters 100 and 300 may be utilized together as described in method 450. Other suitable systems for the execution of method 450 can also be utilized (e.g., multi-node cluster 200 of FIG. 2). Additionally, implementation of method 450 is not limited to such examples.

In the example of FIG. 4C, method 450 may be a method of multi-node clusters 100 and 300. At 452, request engine 112 may receive a request 102 containing data at owner node 110. This receipt may be performed similarly to the receipt of request 302 at request engine 312 at owner node 310 of FIG. 3, as described above. This receipt may also be performed as described above in relation to request engine 112 of FIG. 1A.

At 454, request engine 112 may store the data at owner node 110, similar to the manner in which request engine 312 may store the data at owner node 310, as described above in relation to request engine 312 of FIG. 3. At 456, request engine 112 may duplicate the data at a duplicate data location on, for example, service node 120, similar to the manner in which request engine 312 may duplicate the data at a duplicate data location 308 on service node 320, as described above in relation to request engine 312 of FIG. 3.

At 458, request engine 112 may generate request log entry 116 in request log 114 that identifies the duplicate data location. This generation may be performed similarly to the generation of request log entry 316 in request log 314 that identifies duplicate data location 308, as described above in relation to request engine 312 of FIG. 3. This generation may also be performed as described above in relation to request engine 112 of FIG. 1A. At 460, request engine 112 may issue a zero-copy request 130 that identifies the duplicate data location to service engine 122 on service node 120. This issuance may be performed similarly to the issuance of zero-copy request 330 that identifies duplicate data location 308 to service engine 322 on service node 320, as described above in relation to request engine 312 of FIG. 3. This issuance may also be performed as described above in relation to request engine 112 of FIG. 1A.

At 462 of method 450, service engine 122 may receive zero-copy request 130 and generate a service log entry 126 in service log 124 that identifies the duplicate data location. This receipt and generation may be performed similarly to the receipt of zero-copy request 330 and generation of a service log entry 326 in service log 324 that identifies duplicate data location 308, as described above in relation to service engine 322 of FIG. 3. This generation of a service log entry may also be performed as described above in relation to service engine 122 of FIG. 1A.

At 464, determine engine 132 may determine that owner node 110 has not failed and may determine that service node 120 has failed. This determination may be performed similarly to a determination that owner node 310 has not failed and service node 320 as failed, as described above in relation to determine engine 322 of FIG. 3. This determination may also be performed as described above in relation to determine engine 132 of FIG. 1A. Based on the determinations, at 466, recover engine 142 may scan service log 124 and re-tag each duplicate data location with a serviced tag. This scanning and re-tagging may be performed as described above in relation to 144 of FIG. 1B. At 468, recover engine 142 may determine that a duplicate data location has a requested tag. This determination may be performed as described above in relation to 145 of FIG. 1B. At 470, recover engine 142 may identity the request log entry 116 in the request log 114 that identifies the duplicate data location and reissue zero-copy request 130. The identification of request log entry 116 may be performed as described above in relation to 146 of FIG. 1B. Reissuance of zero-copy request 130 may be performed as described above in relation to FIG. 1B.

Although the flowchart of FIG. 4C shows a specific order of performance of certain functionalities, method 450 may not be limited to that order. For example, the functionalities shown in succession in the flowchart may be performed in a different order, may be executed concurrently or with partial concurrence, or a combination thereof. In some examples, functionalities described herein in relation to FIG. 4C may be provided in combination with functionalities described herein in relation to any of FIGS. 1C, 2A-B, 4A-B, 4D, and 5.

Figure 4D:
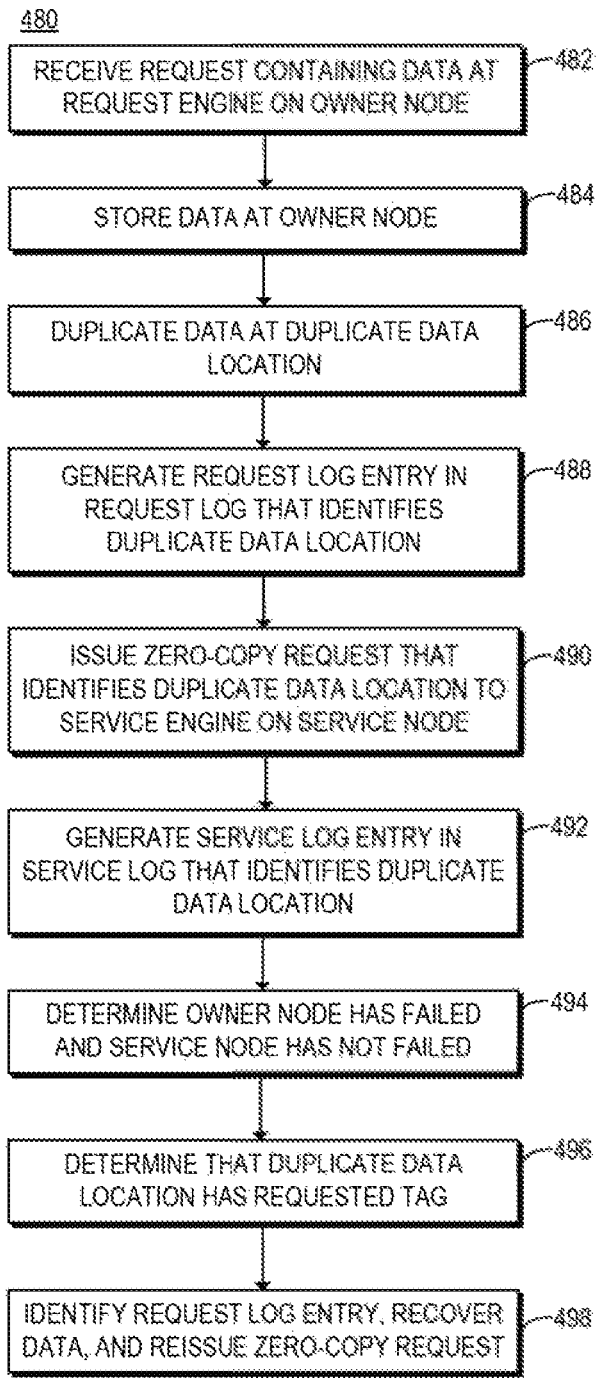
FIG. 4D is a flowchart of an example method of managing transactions for a multi-node cluster including determining that the owner node has failed, determining that the service node has not failed, recovering data, and reissuing the zero-copy request.

FIG. 4D is a flowchart of an example method 480 of managing transactions for a multi-node cluster including determining that the owner node has failed, determining that the service node has not failed, recovering data, and reissuing the zero-copy request. Execution of method 480 described below with reference to various features of multi-node clusters 100 and 300 of FIGS. 1 and 3, respectively. These features of multi-node clusters 100 and 300 may be utilized together as described in method 480. Other suitable systems for the execution of method 450 can also be utilized (e.g., multi-node cluster 200 of FIG. 2). Additionally, implementation of method 480 is not limited to such examples.

In the example of FIG. 4D, method 480 may be a method of multi-node clusters 100 and 300. At 482, request engine 112 may receive a request 102 containing data at owner node 110. This receipt may be performed similarly to the receipt of request 302 at request engine 312 at owner node 310 of FIG. 3, as described above. This receipt may also be performed as described above in relation to request engine 112 of FIG. 1A.

At 484, request engine 112 may store the data at owner node 110, similar to the manner in which request engine 312 may store the data at owner node 310, as described above in relation to request engine 312 of FIG. 3. At 486, request engine 112 may duplicate the data at a duplicate data location on, for example, service node 120, similar to the manner in which request engine 312 may duplicate the data at a duplicate data location 308 on service node 320, as described above in relation to request engine 312 of FIG. 3.

At 488, request engine 112 may generate request log entry 116 in request log 114 that identifies the duplicate data location. This generation may be performed similarly to the generation of request log entry 316 in request log 314 that identifies duplicate data location 308, as described above in relation to request engine 312 of FIG. 3. This generation may also be performed as described above in relation to request engine 112 of FIG. 1A. At 490, request engine 112 may issue a zero-copy request 130 that identifies the duplicate data location to service engine 122 on service node 120. This issuance may be performed similarly to the issuance of zero-copy request 330 that identifies duplicate data location 308 to service engine 322 on service node 320, as described above in relation to request engine 312 of FIG. 3. This issuance may also be performed as described above in relation to request engine 112 of FIG. 1A.

At 492 of method 480, service engine 122 may receive zero-copy request 130 and generate a service log entry 126 in service log 124 that identifies the duplicate data location. This receipt and generation may be performed similarly to the receipt of zero-copy request 330 and generation of a service log entry 326 in service log 324 that identifies duplicate data location 308, as described above in relation to service engine 322 of FIG. 3. This generation of a service log entry may also be performed as described above in relation to service engine 122 of FIG. 1A.

At 494, determine engine 132 may determine that owner node 110 has failed and may determine that service node 120 has not failed. This determination may be performed similarly to a determination that owner node 310 has failed and service node 320 has not failed, as described above in relation to determine engine 322 of FIG. 3. This determination may also be performed as described above in relation to determine engine 132 of FIG. 1A. Based on the determinations, at 496, recover engine 142 may determine that a duplicate data location has a requested tag. This determination may be performed as described above in relation to 148 of FIG. 1C. At 498, recover engine 142 may identify the request log entry 116 in the request log 114 that identifies the duplicate date location, recover the data from the duplicate data location, and reissue zero-copy request 130. The identification of request log entry 116 may be performed as described above in relation to 149 of FIG. 1C. The recovery of data from the duplicate data location may be performed as described above in relation to 150 of FIG. 1C. Reissuance of zero-copy request 130 may be performed as described above in relation to FIG. 1C.

Although the flowchart of FIG. 4D shows a specific order of performance of certain functionalities, method 480 may not be limited to that order. For example, the functionalities shown in succession in the flowchart may be performed in a different order, may be executed concurrently or with partial concurrence, or a combination thereof. In some examples, functionalities described herein in relation to FIG. 4D may be provided in combination with functionalities described herein in relation to any of FIGS. 1B, 2A-B, 4A-C, and 5.

Figure 5A:
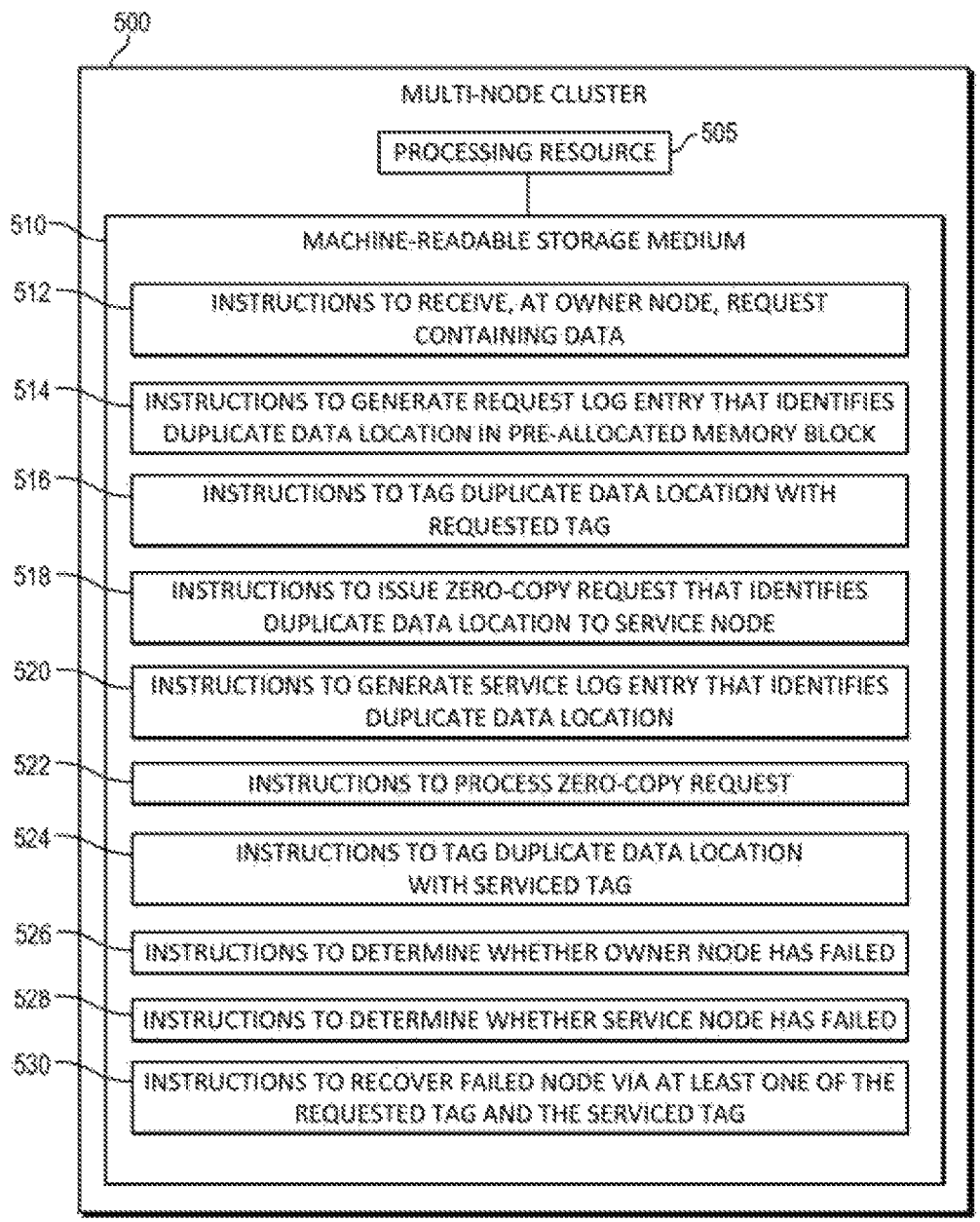
FIG. 5A is a block diagram of an example machine-readable storage medium including instructions to tag a duplicate data location in a pre-allocated memory block with a requested tag and a serviced tag and use at least one of the requested tag and the serviced tag to recover a failed node via a transaction management system in a multi-node cluster.

FIG. 5A is a block diagram of an example machine-readable storage medium including instructions to tag a duplicate data location in a pre-allocated memory block with a requested tag and a serviced tag and use at least one of the requested tag and the serviced tag to recover a failed node via a transaction management system in a multi-node cluster.

Multi-node cluster 500 includes a processing resource 505 and a machine-readable storage medium 510 comprising (e.g., encoded with) instructions 512, 514, 516, 518, 520, 522, 524, 526, 528, and 530 executable by processing resource 505 to implement functionalities described herein in relation to FIG. 5A. In some examples, storage medium 510 may include additional instructions. In other examples, the functionalities described herein in relation to instructions 512, 514, 516, 518, 520, 522, 524, 526, 528, 530, and any additional instructions described herein in relation to storage medium 510, may be implemented at least in part in electronic circuitry (e.g., via engines comprising any combination of hardware and programming to implement the functionalities of the engines, as described above).

A multi-node cluster, as described herein, may refer to multiple nodes that work together as a single system. In some examples, each node of the multi-node cluster may utilize a same operating system configuration and a same or similar hardware configuration. In other examples, nodes of the multi-node cluster may utilize differing operating system configurations or differing hardware configurations. A node may be any networking or computing device suitable for execution of the functionality described below. As used herein, a node may be a desktop computer, laptop (or notebook) computer, workstation, tablet computer, mobile phone, smart device, switch, router, server, blade enclosure, or any other processing device or equipment including a processing resource.

Multi-node cluster 500 may comprise an owner node and a service node. The owner node may refer to a node within multi-node cluster 500 that owns or manages a particular request. The service node may refer to a node within multi-node cluster 500 that services or processes a particular request. In some examples, the nodes within multi-node cluster 100 may communicate via a computer network (e.g., Internet, Local Area Network (LAN), Wide Area Network (WAN), etc.). Although two nodes are described herein, a multi-node cluster may involve any suitable number of nodes more than one. The owner node and the service node may also be located on a single or same node. In such an example, the functionalities of the owner node and the service node are performed by the same node, which both owns and manages a particular request and services and processes the request.

Instructions 512 may receive a request at the owner node. In the examples described herein, a request may represent a transaction or operation to be performed by the multi-node cluster 500. In some examples the request may contain data. For example, the request may contain data and be a request to perform a write operation involving the data. In some examples, instructions 512 may implement the functionality discussed above in relation to request engine 112, request engine 212, and/or request engine 312 in FIGS. 1, 2 and 3, respectively.

Instructions 514 may generate a request log entry in a request log. The request log may be located at the owner node. A redundant copy of the request log may also be created at another node of multi-node cluster 500 such as the service node. In some examples, a redundant copy of the request log may be created at each node of multi-node cluster 500. In other examples, a redundant copy of the request log may be created at multiple, but not all, nodes of multi-node cluster 500. In some such examples, the request log may be mirrored to another node. The request log may also be located separate or remote from, but accessible to multi-node cluster 500.

The request log entry may identify a duplicate data location. In some examples, the request log entry may identify the duplicate data location with a pointer, an address, or other mechanism sufficient to identify the duplicate data location. A duplicate data location, as described herein, may refer to a duplicate or second storage area location for data that may be accessed by the owner node, the service node, and a recover engine, as necessary. The duplicate data location may be located within a pre-allocated memory block to which both the owner node and service node have access. As used in examples herein, a pre-allocated memory block may refer to a block of memory that was allocated prior to its use and may be accessed by a request engine, a service engine, and a recover engine, as necessary. A pre-allocated memory block may be allocated temporarily or for a fixed amount of time. In some examples, duplicate data location may be located in a pre-allocated memory block at a service node. In other examples, duplicate data location may be located in a pre-allocated memory block at another node (e.g., other than the service node) within multi-node cluster 500. For instance, where the owner node and the service node are the same node, the duplicate data location may be located in another node within multi-node cluster 500. In some examples, instructions 514 may implement the functionality discussed above in relation to request engine 112, request engine 212, and/or request engine 312 in FIGS. 1, 2 and 3, respectively.

Instructions 516 may tag the duplicate data location with a requested tag. The requested tag may indicate that a request related to the tagged duplicate data location has been received. In some examples, instructions 516 may implement the functionality discussed above in relation to request engine 112, request engine 212, and/or request engine 312 in FIGS. 1, 2 and 3, respectively. Instructions 518 may then issue (e.g., generate, send) a zero-copy request that identifies the duplicate data location. As described herein, a zero-copy request may refer to a transaction or operation that is performed without a central processing unit (CPU) or processing resource copying data from one memory location to another memory location. In some examples, the zero-copy request may identity the duplicate data location with a pointer, an address, or other mechanism sufficient to identify the duplicate data location. The zero-copy request may be based (at least in part) on the request for which a request log entry was generated in the request log. In some examples, instructions 518 may implement the functionality discussed above in relation to request engine 112, request engine 212, and/or request engine 312 in FIGS. 1, 2 and 3, respectively.

Instructions 520 may receive the zero-copy request and based (at least in part) on the zero-copy request, may generate a service log entry in a service log. The service log may be located at the service node. A redundant copy of the service log may also be created at another node of multi-node cluster 500 such as the owner node. In some examples, a redundant copy of the service log may be created at each node of multi-node cluster 500. In other examples, a redundant copy of the service log may be created at multiple, but not all, nodes of multi-node cluster 500. In some such examples, the service log may be mirrored to another node. The service log may also be located separate or remote from, but accessible to multi-node cluster 500.

The service log entry may identify a duplicate data location. In some examples, the service log entry may identify the duplicate data location with a pointer, an address, or other mechanism sufficient to identify the duplicate data location. In some examples, instructions 520 may implement the functionality discussed above in relation to service engine 122, service engine 222, and/or service engine 322 in FIGS. 1, 2 and 3, respectively.

Instructions 522 may process the zero-copy request. In some such examples, processing the zero-copy request may involve performing the requested operation. In other such examples, for instance an example in which the zero-copy request may involve a write operation, instructions 522 may process the zero-copy request by passing the zero-copy request and/or the data to be written to a queue, for example, a first-in-first-out queue or a priority queue, wherein the data is written per its placement in the queue or per its priority, respectively. In some examples, instructions 522 may implement the functionality discussed above in relation to service engine 122, service engine 222, and/or service engine 322 in FIGS. 1, 2 and 3, respectively.

Instructions 524 may then tag the duplicate data location with a serviced tag. The serviced tag may indicate that the zero-copy request related to the tagged duplicate data location has been processed. In some examples, the serviced tag may replace an earlier tag, the requested tag. In other examples, the serviced tag may be added without altering, clearing, or removing the requested tag. Instructions 524 may implement the functionality discussed above in relation to service engine 122, service engine 222, and/or service engine 322 in FIGS. 1, 2 and 3, respectively.

Instructions 526 may determine whether the owner node has failed. In some examples, determining whether the owner node has failed may involve receiving or monitoring fault or error messages. In other examples, determining whether the owner node has failed may involve querying the owner node. In some examples, instructions 526 may implement the functionality discussed above in relation to determine engine 132, determine engine 232, and/or service engine 332 in FIGS. 1, 2 and 3, respectively.

Instructions 528 may determine whether the service node has failed. In some examples, determining whether the service node has failed may involve receiving or monitoring fault or error messages. In other examples, determining whether the service node has failed may involve querying the service node. In some examples, instructions 528 may implement the functionality discussed above in relation to determine engine 132, determine engine 232, and/or service engine 332 in FIGS. 1, 2 and 3, respectively.

Based (at least in part) on a determination that at least one of the owner node and the service node have failed, instructions 530 may recover the failed node via at least one of the requested tag and the serviced tag of the duplicate data location. In some examples, recovery may involve reviewing, replaying, and/or analyzing the request log entries and/or the service log entries at the time of the failure or fault to ensure that the effects of a requested operation or transaction persist in memory. In some such examples, recovery may involve undoing the effects of an incomplete requested operation or transaction to ensure the effects of an incomplete requested operation or transaction do not persist in memory. In some examples, instructions 530 may implement the functionality discussed above in relation to recover engine 142, recover engine 242, and/or recover engine 342 in FIGS. 1, 2 and 3, respectively.

Figure 5B:
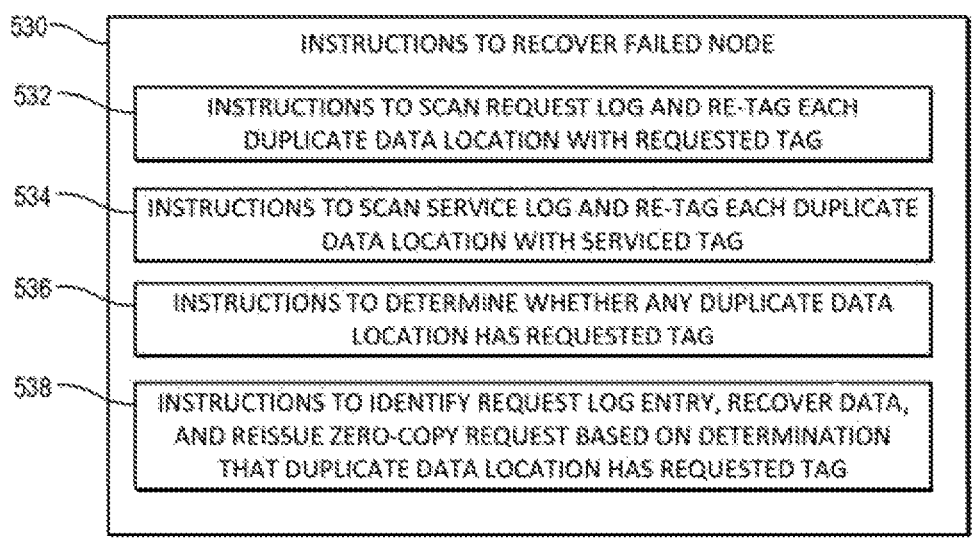
FIG. 5B is a block diagram of example instructions to recover a failed node in a multi-node cluster based on a determination that the owner node and service node are the same node and have failed.

FIG. 5B is a block diagram of example instructions to recover a failed node when the owner node and service node are located on a single, failed node. Based on a determination that the owner node and the service node are the same node and have failed, instructions 532 may scan the request log and re-tag each duplicate data location identified in the request log with the requested tag. In some examples, scanning the request log may involve accessing and reviewing each request log entry and analyzing each duplicate data location identified in each request log entry. Re-tagging each duplicate data location may involve removing or clearing any existing tag at the duplicate data location and replacing it with a requested tag. In other examples, re-tagging each duplicate data location may involve adding a requested tag without removing any previous tags. In yet other examples, re-tagging each duplicate data location may involve analyzing any existing tag at a duplicate data location, determining whether the existing tag is a requested tag, and if it is not, replacing the tag with the requested tag. In some examples, instructions 532 may implement the functionality discussed above in relation to recover engine 242 at 244 in FIGS. 2A and 2B.

Instructions 534 may scan the service log and re-tag each duplicate data location identified in the service log with the serviced tag. In some examples, scanning the service log involves reviewing each service log entry and analyzing each duplicate data location identified in each service log entry. Re-tagging each duplicate data location may involve removing or clearing any existing tag at the duplicate data location and replacing it with a serviced tag. In other examples, re-tagging each duplicate data location involves adding a serviced tag without removing any previous tags. In yet other examples, re-tagging each duplicate data location involves analyzing any existing tag at a duplicate data location, determining whether the existing tag is a serviced tag, and if it is not, replacing the tag with the serviced tag. In some examples, instructions 534 may implement the functionality discussed above in relation to recover engine 242 at 245 in FIGS. 2A and 2B.

Instructions 536 may determine whether any duplicate data location remains tagged with a requested tag. In some examples, each duplicate data location may be reviewed to determine whether any has a requested tag. In other examples, where each duplicate data location may have several tags, the latest or last tag of each duplicate data location may be reviewed to determine whether it is a requested tag. In some examples, instructions 538 may implement the functionality discussed above in relation to recover engine 242 at 246 in FIGS. 2A and 2B.

Based on the determination that a duplicate data location remains tagged with a requested tag, instructions 538 may identify the request log entry that identifies the duplicate data location, recover the data from the duplicate data location, and reissue the zero-copy request. In some examples, identifying the duplicate data location may involve comparing the duplicate data location against the duplicate data locations identified in the request log. Recovering the data may involve copying the data from the duplicate data location and storing it to another storage location. Reissuing the zero-copy request may involve reconstructing or regenerating the zero-copy request based (at least in part) on the request log entry and the recovered data. In some examples, the reissued zero-copy request identifies the duplicate data location. In other examples, reissued zero-copy request 230 may identify the recovered data in its new location. In some examples, instructions 538 may implement the functionality discussed above in relation to recover engine 242 at 247 and 248 in FIGS. 2A and 2B.

In examples described herein, a processing resource may include, for example, one processor or multiple processors included in a single device or distributed across multiple devices. As used herein, a processor may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 505 of FIG. 5A may fetch, decode, and execute instructions stored on storage medium 510, to perform the functionalities described above in relation to instructions 512, 514, 516, 518, 520, 522, 524, 526, 528, and 530. Likewise, processing resource 505 of FIG. 5A may fetch, decode, and execute instructions stored on storage medium 510, to perform the additional functionalities described above in relation to instructions 532, 534, 536, and 538 of FIG. 5B. In some such examples, any or all of the instructions of storage medium 510 may be part of a plug-in application or applications, capable of being downloaded and installed by processing resource 505. In other examples, the functionalities of any of the instructions of storage medium 510 may be implemented in the form of electronic circuitry, in the form of executable instructions encoded on a machine-readable storage medium, or a combination thereof. The storage medium may be located either in the multi-node cluster executing the machine-readable instructions, or remote from but accessible to the multi-node cluster (e.g., via a computer network) for execution. In the examples of FIGS. 5A and 5B, storage medium 510 may be implemented by one machine-readable storage medium, or multiple machine-readable storage media.

As used herein, a machine-readable storage medium may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

In some examples, instructions 512, 514, 516, 518, 520, 522, 524, 526, 528, and 530 of FIG. 5A and instructions 532, 534, 536, and 538 of FIG. 5B, may be part of an installation package that, when installed, may be executed by processing resource 505 to implement the functionalities described above. In such examples, storage medium 510 may be a portable medium, such as a CD, DVD, or flash drive, or a memory maintained by a server from which the installation package can be downloaded and installed. In other examples, instructions 512, 514, 516, 518, 520, 522, 524, 526, 528, and 530 of FIG. 5A and instructions 532, 534, 536, and 538 of FIG. 5B may be part of a plug-in application or applications, capable of being downloaded and installed on multi-node cluster 500 by processing resource 505. In yet other examples, instructions 512, 514, 516, 518, 520, 522, 524, 526, 528, and 530 of FIG. 5A and instructions 532, 534, 536, and 538 of FIG. 5B may be part of an application, applications, or component(s) already installed on multi-node cluster 500y, including processing resource 505. In such examples, the storage medium 510 may include memory such as a hard drive, solid state drive, or the like. In some examples, functionalities described herein in relation to either of FIGS. 5A and 5B may be provided in combination with functionalities described herein in relation to any of FIGS. 1-4.

What is claimed is:

1. A transaction management system for a multi-node cluster, comprising:
    a first node comprising at least one first processing resource and at least one first non-transitory machine-readable storage medium comprising instructions executable by the at least one first processing resource to:
        generate, for a request, a request log entry in a request log that identifies a given duplicate data location;
        tag the given duplicate data location with a requested tag; and
        issue a zero-copy request that identifies the given duplicate data location;
    a second node comprising at least one second processing resource and at least one second non-transitory machine-readable storage medium comprising instructions executable by the at least one second processing resource to:
        generate, based on the zero-copy request, a service log entry that identifies the given duplicate data location in a service log;
        process the zero-copy request; and
        tag the given duplicate data location with a serviced tag; and
    a third node comprising at least one third processing resource and at least one third non-transitory machine-readable storage medium comprising instructions executable by the at least one third processing resource to:
        determine that one of the first node and the second node has failed; and
        based on the determination that one of the first node and the second node has failed, recover the failed first or second node, including determining whether to reissue the zero-copy request based on whether the given duplicate data location is tagged with the requested tag or the serviced tag.

2. The transaction management system of claim 1, wherein the given duplicate data location is associated with a pre-allocated memory block.

3. The transaction management system of claim 1, wherein the instructions of the first node are executable by the at least one first processing resource to:
    receive the request, wherein the request contains data;
    store the data at the first node; and
    duplicate the data at the given duplicate data location.

4. The transaction management system of claim 1, wherein the instructions of the third node are executable by the at least one third processing resource to:
    based on a determination that the second node has failed:
        scan the service log and re-tag each duplicate data location identified in the service log with the serviced tag,
        determine whether any duplicate data location is tagged with the requested tag, and
        based on a determination that the given duplicate data location is tagged with the requested tag, identify the request log entry in the request log that identifies the given duplicate data location, and reissue the zero-copy request.

5. The transaction management system of claim 1, wherein the instructions of the third node are executable by the at least one third processing resource to:
    based on a determination that the first node has failed:
        determine whether any duplicate data location identified in the request log is tagged with the requested tag, and
        based on a determination that the given duplicate data location is tagged with the requested tag, identify the request log entry in the request log that identifies the given duplicate data location, recover the data from the given duplicate data location, and reissue the zero-copy request.

6. The transaction management system of claim 1, Wherein the instructions to tag the given duplicate data location with the serviced tag replace the requested tag with the serviced tag.

7. A method of managing transactions for a multi-node cluster, comprising:
    with a first node of the multi-node cluster:
        generating, for a given request, a request log entry in a request log that identifies a given duplicate data location;
        tagging the given duplicate data location with a requested tag; and
        issuing a zero-copy request that identifies the given duplicate data location;
        generating, based on the zero-copy request, a service log entry that identifies the given duplicate data location in a service log;
    with a second node of the multi-node cluster:
        determining that the first node has failed; and
        based on the determination that the first node has failed, recovering the failed first node, including determining whether to reissue the zero-copy request based on whether the duplicate data location is tagged with the requested tag or a serviced tag.

8. The method of claim 7, wherein the first node is a service node for the given request and an owner node for the request.

9. The method of claim 8, wherein the recovering the failed first node comprises:
    based on the determination that the first node has failed:
        scanning the request log and re-tagging each duplicate data location identified in the request log with the requested tag, scanning the service log and re-tagging each duplicate data location identified in the service log with the serviced tag, determining whether any duplicate data location is tagged with the requested tag, and based on a determination that the given duplicate data location is tagged with the requested tag, identifying the request log entry in the request log that identifies the given duplicate data location, recovering data from the given duplicate data location, and reissuing the zero-copy request.

10. The method of claim 9, wherein, when re-tagging each duplicate data location identified in the service log with the serviced tag, the serviced tag replaces the requested tag.

11. The method of claim 7, wherein the first node is an owner node and a service node for the request.

12. The method of claim 7, further comprising:
receiving the given request at the first node, the given request containing data;
storing the data at the first node; and
duplicating the data at the given duplicate data location.

13. An article comprising at least one non-transitory machine-readable storage medium comprising instructions executable by at least one processing resource of a first node of a multi-node cluster to:
determine that a second node of the multi-node cluster has failed;
when the failed second node is an owner node and not a service node for a given request:
determine whether any duplicate data location identified in a request log is tagged with a requested tag, wherein the request log includes a request log entry generated for the given request, and the request log entry identifies a given duplicate data location that is tagged with the requested tag after the request log entry is generated; and
based on a determination that the given duplicate data location is tagged with the requested tag after the determination that the second node has failed:
identify the request log entry in the request log that identifies the given duplicate data location;
recover data from the given duplicate data location; and
reissue a zero-copy request identifying the given duplicate data location.

14. The article of claim 13, wherein the first node is the service node for the given request, and wherein the instructions comprise instructions executable by the at least one processing resource of the first node to:
generate a service log entry in a service log, based on the zero-copy request that was previously issued and that identifies the duplicate data location;
process the zero-copy request that was previously issued; and
tag the duplicate data location with a serviced tag.

15. The article of claim 14, wherein the instructions to tag the duplicate data location with the serviced tag replaces the requested tag with the serviced tag.

16. The article of claim 14, wherein the first node is the owner node for the given request, and wherein the instructions comprise instructions executable by the at least one processing resource of the first node to:
receive, at the first node, the given request containing the data;
generate the request log entry in the request log for the given request, the request log entry identifying the duplicate data location, wherein the duplicate data location is associated with a pre-allocated memory block;
tag the duplicate data location with the requested tag; and
issue the zero-copy request identifying the duplicate data location to the second node.

17. The article of claim 13, the instructions comprising instructions executable by the at least one processing resource of the first node to:
when the failed second node is the service node for the given request and not the owner node for the given request:
scan a service log and re-tag each duplicate data location identified in the service log with a serviced tag;
determine whether any duplicate data location is tagged with the requested tag; and
based on a determination that the given duplicate data location is tagged with the requested tag:
identify the request log entry in the request log that identifies the given duplicate data location; and
reissue the previously issued zero-copy request.

* * * * *